United States Patent
Greenwell et al.

(10) Patent No.: US 11,285,573 B2
(45) Date of Patent: Mar. 29, 2022

(54) MULTIPLE CHAMBER HYDRAULIC MULTI-JACK BOLT TENSIONERS

(71) Applicant: Superbolt, Inc., Carnegie, PA (US)

(72) Inventors: Steven Greenwell, Mooretown (CA); Andrew Duncan McPhee, Chapel Hill (AU)

(73) Assignee: Superbolt, Inc., Carnegie, PA (US)

( * ) Notice: Subject to any disclaimer, the term of this patent is extended or adjusted under 35 U.S.C. 154(b) by 0 days.

(21) Appl. No.: 16/956,501

(22) PCT Filed: Dec. 20, 2018

(86) PCT No.: PCT/US2018/066669
§ 371 (c)(1),
(2) Date: Jun. 19, 2020

(87) PCT Pub. No.: WO2019/126426
PCT Pub. Date: Jun. 27, 2019

(65) Prior Publication Data
US 2021/0008676 A1  Jan. 14, 2021

Related U.S. Application Data

(60) Provisional application No. 62/607,978, filed on Dec. 20, 2017.

(51) Int. Cl.
| B23P 19/06 | (2006.01) |
| F16B 31/04 | (2006.01) |
| F16D 1/033 | (2006.01) |

(52) U.S. Cl.
CPC .......... *B23P 19/067* (2013.01); *F16B 31/043* (2013.01); *F16D 1/033* (2013.01)

(58) Field of Classification Search
CPC ....... F16B 31/043; B25B 29/02; B23P 19/067
See application file for complete search history.

(56) References Cited

U.S. PATENT DOCUMENTS

| 3,154,006 A | * | 10/1964 | Novak | F16B 43/00 |
| | | | | 29/452 |
| 3,424,080 A | * | 1/1969 | Pappas | F16B 31/043 |
| | | | | 100/214 |

(Continued)

FOREIGN PATENT DOCUMENTS

| EP | 2199025 A1 | * | 6/2010 | ............. B25B 29/02 |
| EP | 2827008 A1 | | 1/2015 | |

(Continued)

OTHER PUBLICATIONS

WO-2007043143-A1 machine translation (Year: 2007).*

(Continued)

*Primary Examiner* — Jacob J Cigna
*Assistant Examiner* — Michael W Hotchkiss
(74) *Attorney, Agent, or Firm* — Knobbe, Martens, Olson & Bear, LLP

(57) ABSTRACT

A multi jack tensioner for applying tension to a fastener, the tensioner comprising:
  a body having at least one section, including a first body section formed to engage an elongate fastening member or integrally formed therewith;
  a load bearing member for applying force to a workpiece to be fastened and arranged for location about said fastening member adjacent the body;
  a plurality of pressure chambers between the load bearing member and the body arranged to displace the at least one body section axially relative to the load bearing member in response to hydraulic pressure; and
  a plurality of jack bolts extending between the body section and the load bearing member for further displacing the first body section from the load bearing member;
wherein application of hydraulic pressure to one or more of the plurality of pressure chambers displaces the first (Continued)

body section from the load bearing member thereby tensioning said fastening member and whereby subsequent tensioning of the fastening member is applied by operation of the jack bolts.

20 Claims, 18 Drawing Sheets

(56) References Cited

U.S. PATENT DOCUMENTS

| | | | | | |
|---|---|---|---|---|---|
| 3,462,180 | A | * | 8/1969 | Bunyan | F16B 31/043 403/40 |
| 3,722,332 | A | * | 3/1973 | Jones | B25B 29/02 81/57.38 |
| 3,877,326 | A | * | 4/1975 | Kock | B25B 29/02 81/57.38 |
| 4,182,215 | A | * | 1/1980 | Green | F16B 31/04 411/434 |
| 4,338,037 | A | * | 7/1982 | Deminski | F04B 39/0022 403/24 |
| 4,438,901 | A | * | 3/1984 | Reneau | B25B 29/02 254/29 A |
| 4,622,730 | A | * | 11/1986 | Steinbock | B21B 27/035 403/320 |
| 4,844,418 | A | * | 7/1989 | Cole | B25B 29/02 254/29 A |
| 4,846,444 | A | * | 7/1989 | Vassalotti | B23P 19/067 254/29 A |
| 4,854,798 | A | * | 8/1989 | Snyder | F16B 31/043 411/434 |
| 4,998,453 | A | * | 3/1991 | Walton | B25B 29/02 81/57.38 |
| 5,046,906 | A | * | 9/1991 | Bucknell | F16C 35/063 411/432 |
| 5,075,950 | A | * | 12/1991 | Steinbock | F16B 31/04 29/426.5 |
| 5,083,889 | A | * | 1/1992 | Steinbock | B21B 27/035 403/320 |
| 5,285,722 | A | * | 2/1994 | Schockman | B30B 15/0041 100/214 |
| 5,468,106 | A | * | 11/1995 | Percival-Smith | B25B 29/02 411/434 |
| 5,527,015 | A | * | 6/1996 | Percival-Smith | B23P 19/067 254/29 A |
| 6,199,453 | B1 | * | 3/2001 | Steinbock | B23P 19/068 29/452 |
| 6,250,216 | B1 | * | 6/2001 | Bornhorst | B21J 9/20 100/258 A |
| 6,263,764 | B1 | * | 7/2001 | Steinbock | B23P 19/067 29/452 |
| 6,763,570 | B2 | * | 7/2004 | Abbott | G21C 13/073 29/525.01 |
| 6,938,450 | B1 | * | 9/2005 | Zhang | B30B 15/045 100/214 |
| 7,140,824 | B2 | * | 11/2006 | Bucknell | B25B 29/02 411/14.5 |
| 7,195,439 | B2 | * | 3/2007 | Kamppila | F16B 31/043 411/14.5 |
| 7,552,912 | B2 | * | 6/2009 | Imai | F16B 1/005 254/29 A |
| 8,864,404 | B2 | * | 10/2014 | Bucknell | F16B 31/043 403/31 |
| 9,188,146 | B1 | * | 11/2015 | Trautman | B25B 29/02 |
| 10,436,657 | B2 | * | 10/2019 | Kury | F16B 31/02 |
| 10,569,401 | B2 | * | 2/2020 | Ribault | B23P 19/067 |
| 2003/0135975 | A1 | | 7/2003 | Abbott et al. | |
| 2004/0165963 | A1 | * | 8/2004 | Bucknell | B25B 29/02 411/14.5 |
| 2007/0051101 | A1 | * | 3/2007 | Imai | F16B 37/00 60/422 |
| 2017/0051611 | A1 | * | 2/2017 | Hofsommer | F01D 5/066 |

FOREIGN PATENT DOCUMENTS

| | | |
|---|---|---|
| WO | 1996041703 A1 | 12/1996 |
| WO | 2007043143 A1 | 4/2007 |
| WO | WO-2007043143 A1 * | 4/2007 ............ F16B 31/043 |

OTHER PUBLICATIONS

International Search Report for the Application No. PCT/US2018/066669, dated Apr. 8, 2019 in 4 pages.

Written Opinion for the Application No. PCT/US2018/066669, dated Apr. 8, 2019 in 4 pages.

* cited by examiner

MULTIPLE CHAMBER HYDRAULIC MULTI-JACK BOLT TENSIONERS

CROSS-REFERENCE TO RELATED APPLICATIONS

This application is the U.S. National Phase under 35. U.S.C. § 371 of International Application PCT/US2018/06669, filed Dec. 20, 2018, which claims the benefit of U.S. Provisional Application No. 62/607,978, filed Dec. 20, 2017. The disclosures of the above-described applications are hereby incorporated by reference in their entirety.

FIELD OF INVENTION

The present disclosure generally relates to hydraulically assisted fastening and/or tensioning devices, and methods of using the same.

BACKGROUND

A multi-jack bolt tensioner (MJT) may be used for tightening bolts, shafts, or studs in the oil and gas, energy, transportation, and mining industries, for example. The MJT may be used as a direct replacement for conventional nuts and bolts. FIG. 1 is a partially cutaway version of a nut-style MJT 200. The MJT 200 comprises an annular body 202. The body 202 of the MJT 200 is formed with a threaded central hole 205 to receive a bolt, shaft, or stud. A polar array of threaded jack bolt holes 201, each disposed on a circle concentric with the central hole, pass though the body 202. Corresponding jack bolts 204 traverse the jack bolt holes 201 and are threadedly received therein. The MJT 200 further includes a load bearing member in the form of a hardened washer 206 against which points of the jack bolts 204 abut in use. The hardened washer 206 bears against a workpiece being fastened.

As an alternative to the nut-style MJT of FIG. 1, bolt-style MJTs are also known. A bolt-style MJT generally comprises a body having a threaded shaft that may be used for blind tapped holes and counterbores. MJTs are commercially available from Superbolt, Carnegie Pa. Further discussions of MJTs may be found in U.S. Pat. Nos. 4,622,730, RE33,490, 4,927,305, 5,075,950, 5,083,889 and 6,112,396, which are incorporated herein by reference. Throughout this specification the reference to methods and documents of the prior art should not be taken as an admission or evidence that any such prior art information constitutes common general knowledge.

FIGS. 2 to 6 illustrate the use of the MJT 200. With reference to FIG. 2, initially hardened washer 206 is installed onto the stud 208. The body 202 is then threaded onto the stud 208 until it seats against the hardened washer 206 to tension the joint. In FIG. 2 the jack bolts 204 are withdrawn so that their points do not extend out of the body 202 of the MJT. Referring now to FIG. 3, once the washer 206 has been located over the stud 208 and the MJT 200 has been threaded onto the stud and into abutment with the washer 206 then four of the jack bolts at 90 degrees apart (i.e. 12 o'clock, 6 o'clock, 9 o'clock and 3 o'clock as circled in FIG. 3) are tightened with a partial torque of 30-70% and this process is then repeated for the remaining four jack bolts. Applying partial torque evenly distributed to all of the jack bolts 204 serves to seat the hardened washer 206 against the contact surface 209 to be fastened, e.g. a flange. With reference to FIG. 4, at 100% target torque the same four jack bolts are then tightened. With reference to FIG. 5, at 100% target torque all of the jack bolts 204 are tightened in a circular pattern. Referring now to FIG. 6, all of the jack bolts 204 are tightened again with a torque wrench 212 for example until they stabilize (usually less than 10 degrees of rotation of each jack bolt 204 is involved in this step). This step may need 2-4 additional passes around the jack bolts so that all of the jack bolts are incrementally tightened and at any one time there is no great imbalance of tension between them.

When the jack bolts 204 are torqued, a tension preload develops evenly along the stud 208, and the axial forces by the jack bolts 204 and opposite reaction force of the stud 208 create a strong clamping force between the surfaces to be fastened together, such as opposed flanges for example. Applying the correct preload is desirable because a pre-tensioned bolt, shaft or stud may be capable of sustaining a greater load and may reduce the likelihood of the bolt, shaft, or stud loosening unintentionally due to e.g., vibration and/or temperature cycling.

However, it will be realized that properly applying a MJT, as has been explained with reference to FIGS. 2 to 6, is typically a demanding and time consuming exercise. An experienced operator may take around five minutes to apply an MJT in the manner that has been discussed. It will be understood that where large plants are being installed there may be hundreds or thousands of MJTs to be fitted. In that case a saving of time for the installation of each MJT results in a very considerable saving of worker hours for the overall project at hand. Furthermore, ensuring that the jack bolts are tightened so that they uniformly and evenly apply force to the hardened washer is a somewhat demanding operation that requires applying torque to the jack bolts in a predetermined sequence. Where the sequence is not followed correctly one of the consequences is that there may be an imbalance in the tensioning of the jack bolts which could potentially lead to a catastrophic failure.

Applicant has earlier developed a hydraulic MJT, as illustrated in a comparative embodiment shown in FIGS. 7 to 9, that allows for the proper and faster placement of jack bolts of an MJT type fastener. The hydraulic MJT 310 according Applicant's earlier invention, the subject of International Patent Application PCT/US2017/037834 (the content of which is hereby incorporated by reference), is in the form of a nut and generally comprises an annular body 320 with central axis "L" having a concentric circular threaded hole 325 formed there through to receive a stud or bolt (not shown). The annular body 320 is formed with a concentric polar array of threaded jack bolt holes therethrough in similar fashion to holes 201 as illustrated in FIG. 1. Through each of the threaded jack bolt holes there passes a corresponding one of a plurality of jack bolts 330a, . . . , 330n (which may be generally referred to herein as simply "330" for brevity). The body 320 sits upon a piston 340 which in the present embodiment comprises a load bearing member that, in use, applies force to a workpiece to be fastened, such as a pipe flange for example. In some situations, the piston 340 may apply the force to the workpiece via an intermediate member, such as a washer.

With reference to FIG. 9, the body 320 and the piston 340 are shaped so that they cooperate to define an annular pressure chamber 350 therebetween. The pressure chamber 350 is in fluid communication via a fluid passage 365 with a hydraulic port 360. The port 360 may be positioned on the top outer periphery of the body 320 adjacent or proximate to at least one of the jack bolts 330. The operation of the hydraulic MJT 310 is further described in the above-referenced '834 application.

Applicant has, in response to further problems experienced with precise control of tension and/or applying appropriate tension to fasteners in a relatively confined space particularly within a limited working envelope, developed a modification or improvement to the earlier invention which conveniently addresses these further problems.

SUMMARY OF INVENTION

According to a first aspect of the present invention there is provided a multi jack tensioner for applying tension to a fastener, the tensioner comprising:

a body having at least one section, including a first body section formed to engage an elongate fastening member or integrally formed therewith;

a load bearing member for applying force to a workpiece to be fastened and arranged for location about said fastening member adjacent the body;

a plurality of pressure chambers between the load bearing member and the body arranged to displace the at least one body section axially relative to the load bearing member in response to hydraulic pressure; and a plurality of jack bolts extending between the body section and the load bearing member for further displacing the first body section from the load bearing member;

wherein application of hydraulic pressure to one or more of the plurality of pressure chambers displaces the first body section from the load bearing member thereby tensioning said fastening member and whereby subsequent tensioning of the fastening member is applied by operation of the jack bolts.

In one embodiment a first pressure chamber of the plurality of chambers is defined by a surface of the first body section and a surface of the load bearing member whereby introduction of hydraulic pressure into the first pressure chamber displaces the first body section from the load bearing member.

The at least one section of the body preferably includes a second section and wherein a second pressure chamber of the plurality of chambers is defined between a surface of the second section and a surface of a piston that slides in an opening of the second section whereby introduction of hydraulic pressure into the second pressure chamber displaces the piston relative to the second section of the body.

The first section preferably includes a portion that extends into the opening of the second section which is forced away from the second section by the piston upon the introduction of the hydraulic pressure into the second pressure chamber to thereby displace the first section from the load bearing member.

In a preferred embodiment of the invention the load bearing member is axially disposed between the first section and the second section.

The portion of the first body section that extends into the opening of the second section may comprise a lower skirt wherein the first pressure chamber is defined between the load bearing member and the first body section adjacent the lower skirt.

The load bearing member may be formed as a piston arranged to cooperate with the body.

The body may be formed in a "nut style" with an axially extending central hole, wherein the first section thereof is arranged to threadedly engage the elongate fastening member where the elongate fastening member comprises a bolt or stud.

Alternatively, the body may be formed in a "bolt style" with the elongate fastening member integrally formed with the first section of the body.

Preferably first and second hydraulic fluid ports are provided in fluid communication with the first and second pressure chambers.

The first and second hydraulic fluid ports preferably extend from the body at right angles to each other.

In a preferred embodiment of the invention the first hydraulic fluid port is located on an end of the first section adjacent heads of the jack bolts and wherein a fluid passage extends from said first port through the first section to the first pressure chamber.

The second hydraulic fluid port is preferably located on a side of the second section and a fluid passage extends radially from said second port through the second section to the second pressure chamber.

According to a further aspect of the present invention there is provided a multi jack tensioner comprising:

a body having a first body section formed to engage an elongate fastening member or integrally formed therewith;

a first piston received by the first body section for applying force to a workpiece to be fastened;

a first pressure chamber between the first piston and the first body section arranged to displace the first body section from the first piston in response to hydraulic pressure;

the body further including a second body section abutting the first piston and including a co-axial bore for receiving a second piston arranged to selectively abut the first body section;

a second pressure chamber between the second body section and the second piston arranged to displace the second piston from the second body section; and a plurality of jack bolts extending between the first body section and the load bearing member for further displacing the first body portion from a load bearing member;

wherein application of hydraulic pressure to either the first or second hydraulic chamber displaces the first body section relative to the second body section for tensioning said fastening member and whereby subsequent tensioning of the fastening member is applied by operation of the jack bolts.

The first body section may be formed with an axial recess to threadedly engage the elongate fastening member wherein the elongate fastening member comprises a bolt or stud.

Alternatively, the body portion may be integrally formed with the elongate fastening member.

The plurality of jack bolts preferably comprises a polar array of jack bolts threadedly received through holes formed spaced uniformly from a longitudinal central axis of the body at spaced apart locations about an outer surface thereof.

In a preferred embodiment of the invention the plurality of jack bolts comprises a polar array of jack bolts threadedly received through holes formed spaced uniformly from a longitudinal central axis of the body at spaced apart locations about an outer surface thereof.

In another embodiment of the invention a piston may be slidingly received within the body section, and a pressure chamber between the body and piston to receive hydraulic fluid through a port and a fluid passage wherein, when the pressure chamber receives hydraulic fluid, the body and piston axially separate. Alternatively, a piston may be slidingly received externally of the body section.

According to a further aspect of the present invention there is provided a method for compressing first and second workpieces together comprising the steps of:

locating an elongate fastening member across the first and second workpieces wherein a first end of the elongate fastening member is fast with the first workpiece;

tensioning the elongate fastening member by applying hydraulic pressure to one or more of a plurality of pressure chambers axially spaced along the elongate fastening member and disposed between said second end of said fastening member and an outer side of the second workpiece; and further tensioning the elongate member with a plurality of jack bolts;

whereby the tensioning of the elongate fastening member results in compressing the first and second workpieces towards each other.

According to another aspect of the present invention there is provided a multi jack tensioner for applying tension to an elongate fastening member, comprising:

a body having at least one section, including a first body section formed with an axially extending central hole to threadedly engage the elongate fastening member where the elongate fastening member comprises a bolt or stud;

a load bearing member for applying force to a workpiece to be fastened and arranged for location about said fastening member adjacent the body;

a plurality of pressure chambers between the load bearing member and the body arranged to displace the at least one body section axially relative to the load bearing member in response to hydraulic pressure; and a plurality of jack bolts extending between the body section and the load bearing member for further displacing the first body section from the load bearing member;

wherein application of hydraulic pressure to one or more of the plurality of pressure chambers displaces the first body section from the load bearing member thereby tensioning said fastening member and whereby subsequent tensioning of the fastening member is applied by operation of the jack bolts.

In some embodiments the body is integrally formed with the elongate fastening member.

Preferably, the plurality of pressure chambers are axially spaced from one another.

In some embodiments of the invention the load bearing member is formed as a piston arranged to cooperate with the body.

Alternatively, the load bearing member may be formed as a load cell with which a piston cooperates in order to force the first body section in use. Most suitably, the load bearing member may comprise a section of the body housing a piston.

Preferably the plurality of jack bolts may comprise an annular array of jack bolts threadedly received through holes formed spaced uniformly from a longitudinal central axis of the body at spaced apart locations about an outer surface thereof.

In a preferred embodiment of the invention the plurality of jack bolts comprises a polar array of jack bolts threadedly received through holes formed spaced uniformly from a longitudinal central axis of the body at spaced apart locations about an outer surface thereof.

In another embodiment of the invention a piston may be slidingly received within the body section, and a pressure chamber between the body and piston to receive hydraulic fluid through a port and a fluid passage wherein, when the pressure chamber receives hydraulic fluid, the body and piston axially separate. Alternatively, a piston may be slidingly received externally of the body section.

In some embodiments of the invention a piston is slidingly received into the body, and a pressure chamber between the body and piston to receive hydraulic fluid through a port and a fluid passage, wherein when the pressure chamber receives hydraulic fluid, the body and piston axially separate.

The invention encompasses embodiments wherein each of the plurality of jack bolts is in threaded engagement with the first body section and project from the body section into compressive engagement with the load bearing member.

The load bearing member may be selected from a group including the piston, a body section, and a washer.

The loading bearing member comprises a washer in some embodiments of the invention.

A locking collar may be provided for maintaining a distance between the load bearing member and the body subsequent to removal of the hydraulic pressure.

In some embodiments at least one shim is provided for maintaining a distance between the load bearing member and the body subsequent to removal of the hydraulic pressure.

A port for entry of the hydraulic pressure may be positioned on a side outer periphery of the load cell along a plane perpendicular to the longitudinal central axis that does not intersect any jack bolt.

The port may be positioned on a side outer periphery of the load cell along a plane perpendicular to the longitudinal central axis that intersects two jack bolts.

According to another aspect of the present invention there is provided a method of closing a vessel having at least one stud, the method comprising:

threading a first hydraulic MJT onto said at least one stud, wherein the hydraulic MJT comprises a body comprising at least one section having a threaded central hole, and a plurality of jack bolts spaced uniformly from a longitudinal central axis at spaced apart locations about an outer periphery thereof;

a first piston slidingly received into the body to define a first pressure chamber between the first piston and a first section to receive hydraulic fluid through a port and a fluid passage;

a second piston slidingly received into a second section of the body and defining a second pressure chamber therebetween, wherein a body section and respective piston axially separate when the tool is mounted to the stud and at least one of the pressure chambers receives hydraulic fluid;

injecting hydraulic fluid into one or both pressure chambers to tension said at least one stud; and torqueing the plurality of jack bolts to secure a closure of the vessel.

The method may further comprise:

threading a second hydraulic MJT onto another of the at least one stud, and simultaneously injecting hydraulic fluid into the pressure chamber of each of the hydraulic compression tools threaded onto the at least one shaft, wherein each of the pressure chambers are in fluid communication with the other to tension the at least one stud to substantially equal preloads.

The method may further comprise threading at least one multi-jack bolt tensioner to another of the at least one stud adjacent to the hydraulic MJT threaded onto the at least one stud.

It is preferred that the step of tensioning by applying hydraulic pressure and the step of further tensioning with jack bolts are performed at the same end of the elongate fastening member however it is possible that the two steps could be performed at opposite ends of the elongate fastening member. In that case a fastening assembly is contemplated with a hydraulic nut at one end and a MJT at an opposed end.

In a further broad aspect of the invention, there is provided a multi jack tensioner for tensioning an elongate fastener, the tensioner comprising:

a body formed with a bore for receiving an elongate fastener or integrally formed therewith;

one or more axially spaced load bearing members positioned about the elongate fastener;

a plurality of jack bolts disposed around the body for forcing the body from the load bearing members to thereby tension the fastener;

wherein hydraulic chambers are located between the body and an adjacent one of the load bearing members and between adjacent load bearing members, whereby application of hydraulic pressure to one or more of the hydraulic chambers forces the body from the load bearing members for subsequent torqueing of the jack bolts to thereby further tension the fastener.

According to a further aspect of the present invention there is provided a method of using a hydraulic MJT comprising a multi-jack tensioner of the kind set out above to tension a joint, comprising:

installing the tool on a work piece having the joint to be tensioned, injecting hydraulic fluid into at least one chamber to axially separate the body and piston and/or injecting hydraulic fluid separately into a second chamber to pretension the joint; and torqueing the jack bolts to tension the joint.

The hydraulic MJT may comprise a body having a polar array of jack bolts spaced uniformly from a longitudinal central axis at spaced apart locations about an outer surface thereof, a piston slidingly received into the body, and a plurality of pressure chambers between body sections and respective pistons to receive hydraulic fluid through separate ports and associated fluid passages, wherein when a pressure chamber receives hydraulic fluid, the cooperating body section and piston axially separate.

BRIEF DESCRIPTION OF THE DRAWINGS

The embodiments described herein may be better understood by reference to the accompanying drawing figures, in which:

FIG. 1 is a partially cutaway view of a prior art multi jack bolt tensioner (MJT) for tensioning an elongate fastener such as a bolt, stud or the like;

DETAILED DESCRIPTION

Figure 1:
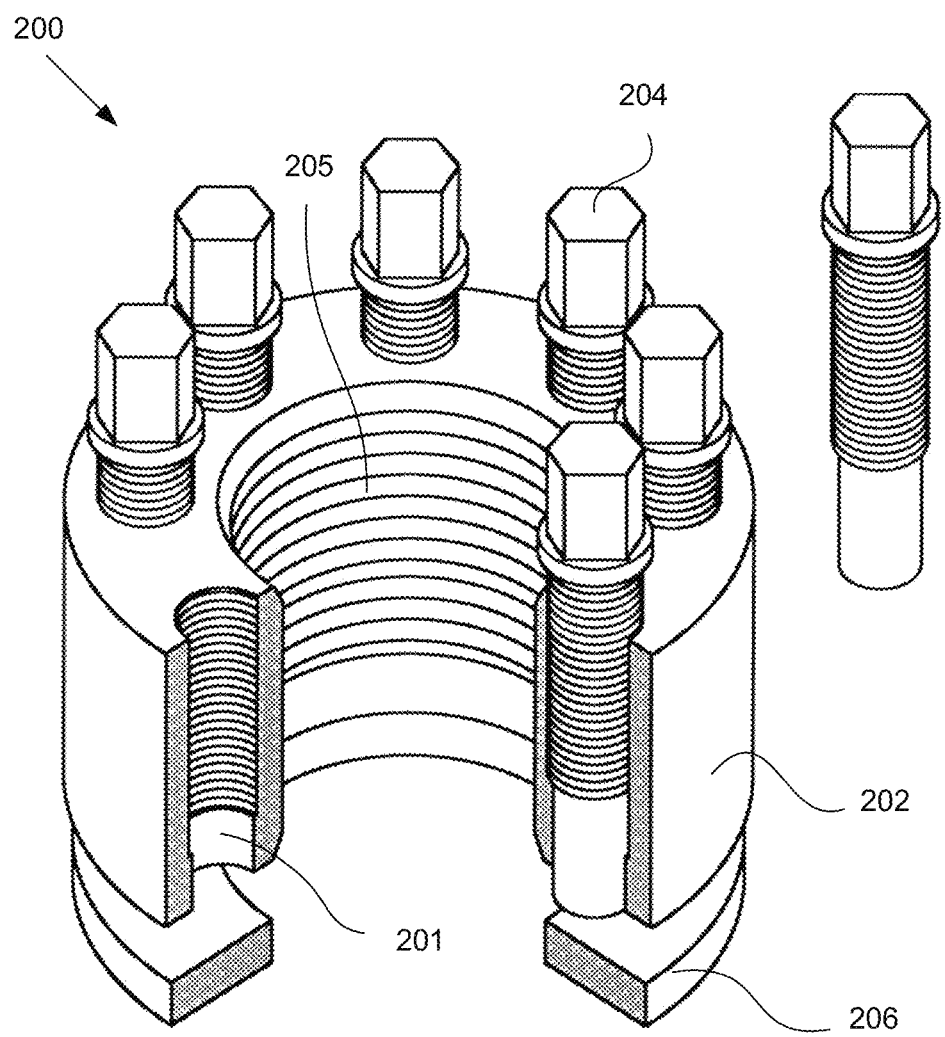
Figure 2:
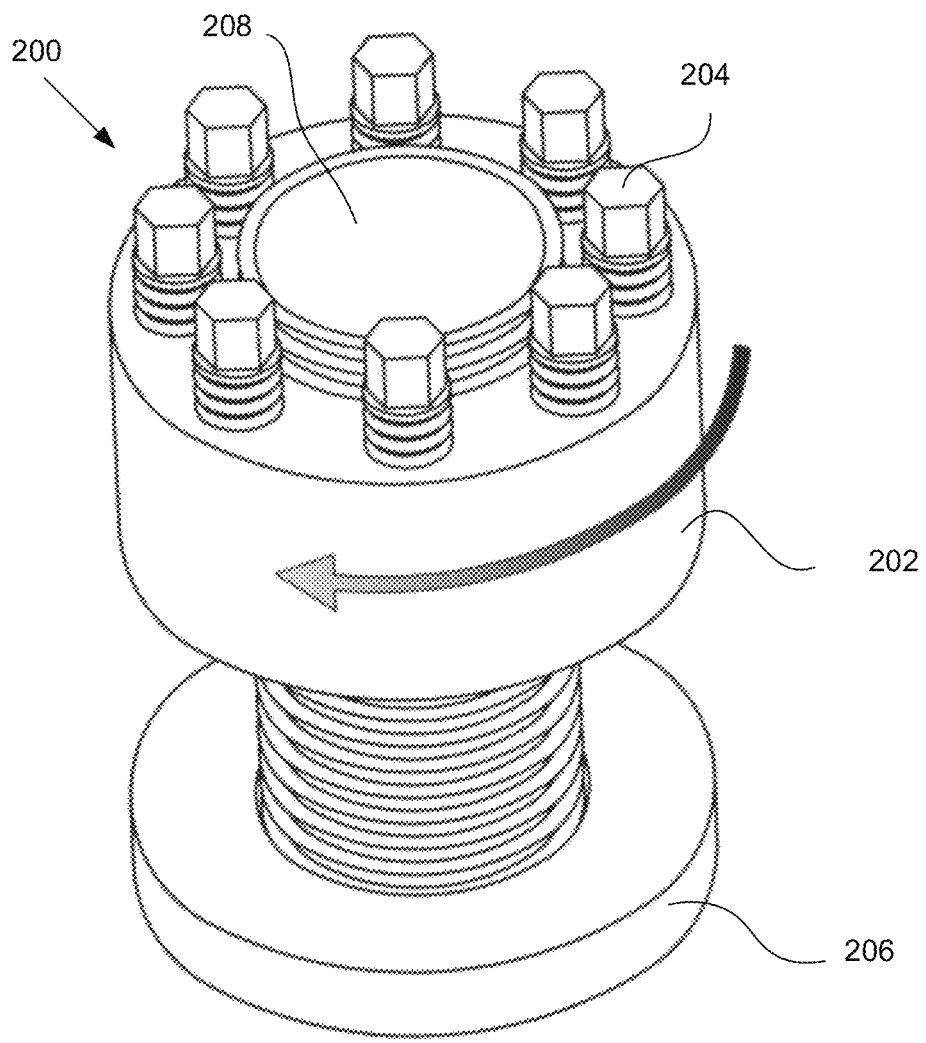
FIGS. 2-6 are a sequence of drawings illustrating the use of the MJT of FIG. 1 for tensioning a stud or bolt.
Figure 3:
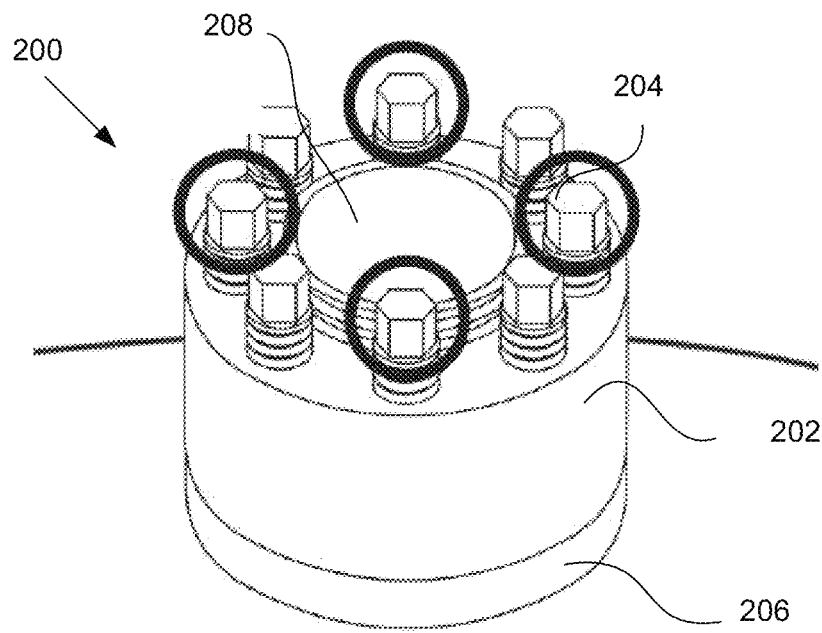
Figure 4:
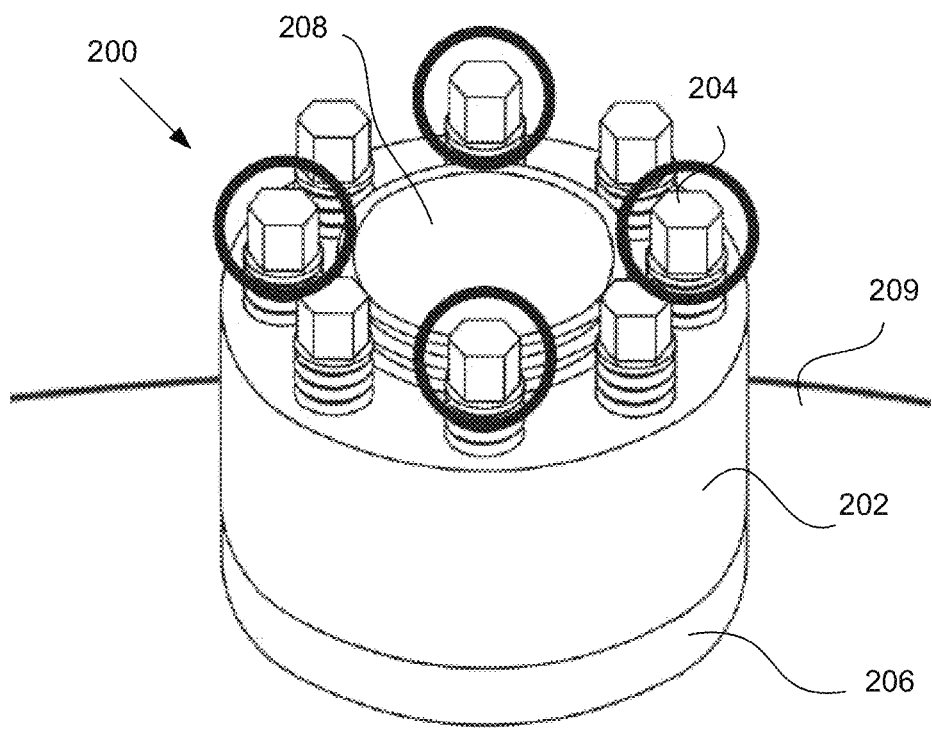
Figure 5:
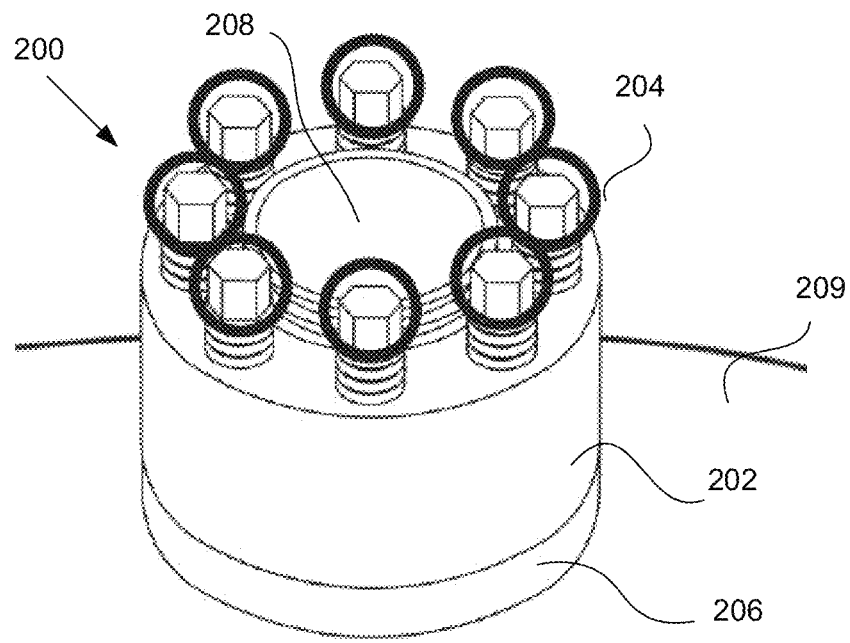
Figure 6:
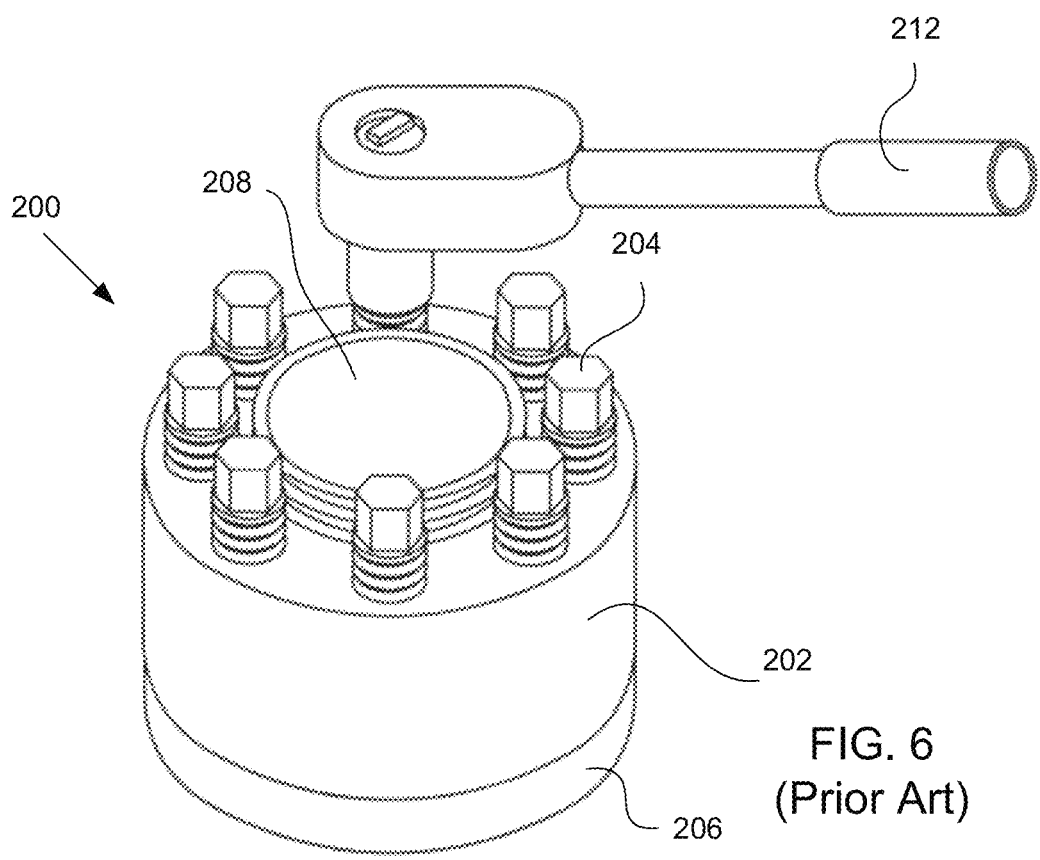
Figure 7:
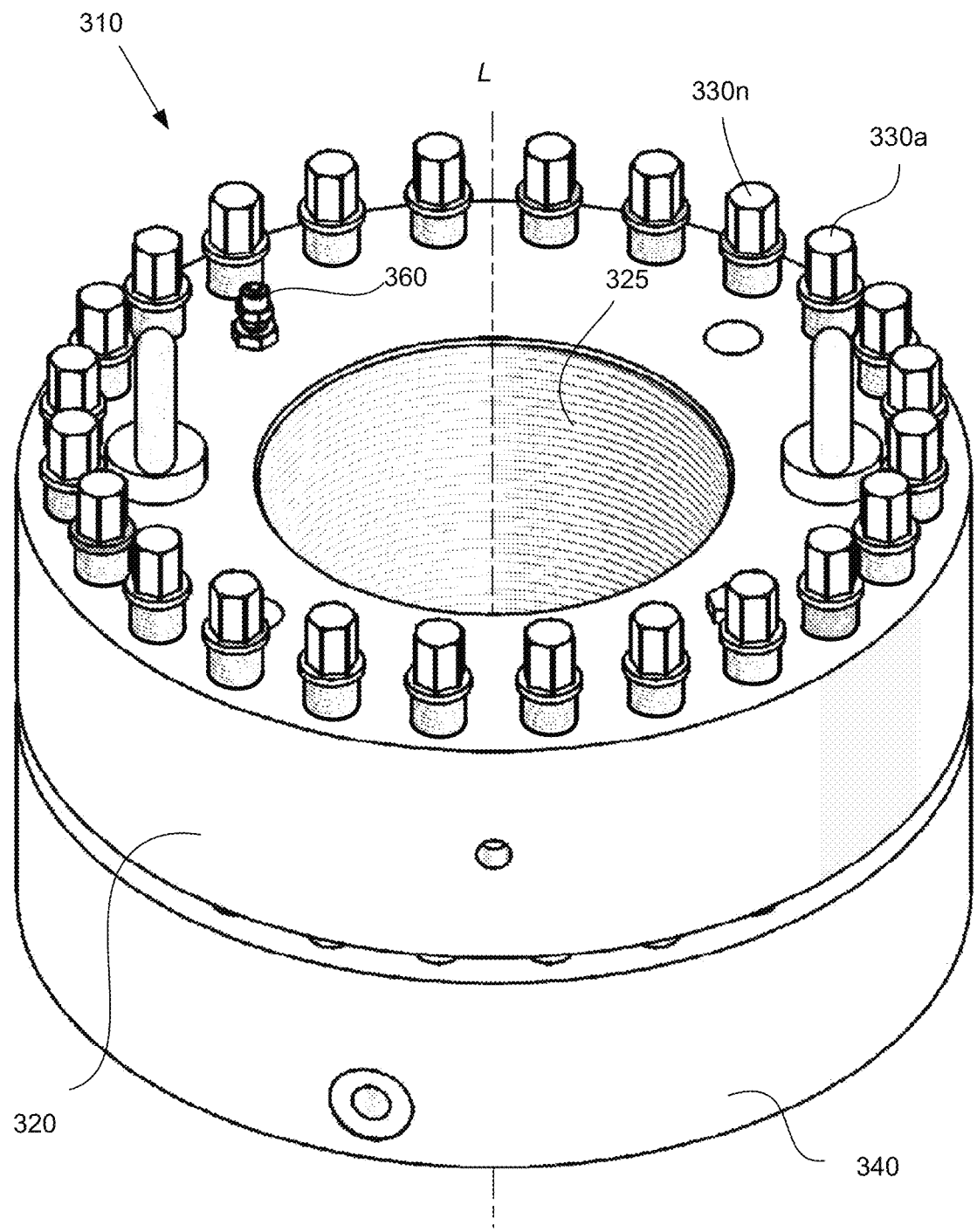
FIG. 7 is an isometric orthogonal view of a hydraulically operated MJT according to a comparative example, the subject of Applicant's co-pending International Patent Application No. PCT/US2017/037834.
Figure 8:
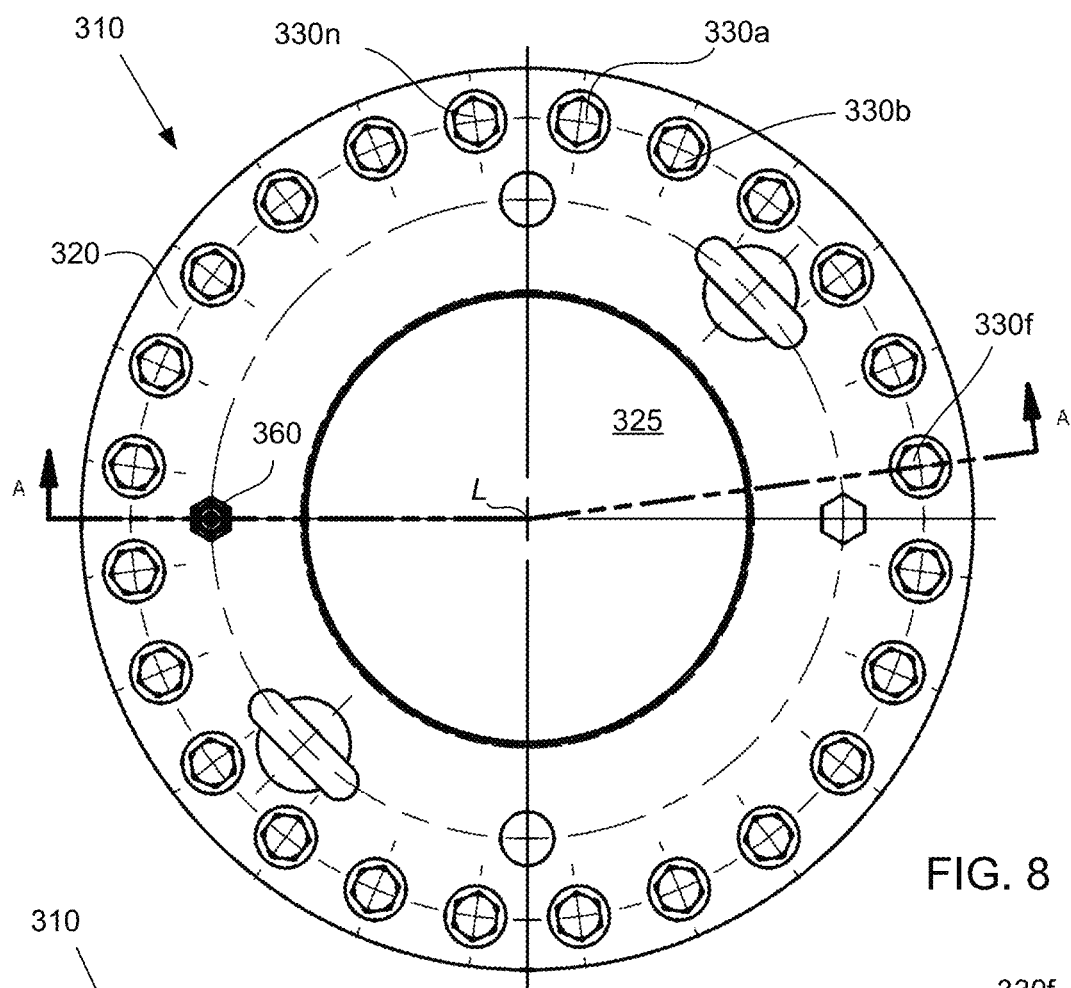
FIG. 8 is a top plan view of the hydraulic MJT of FIG. 7.
Figure 9:
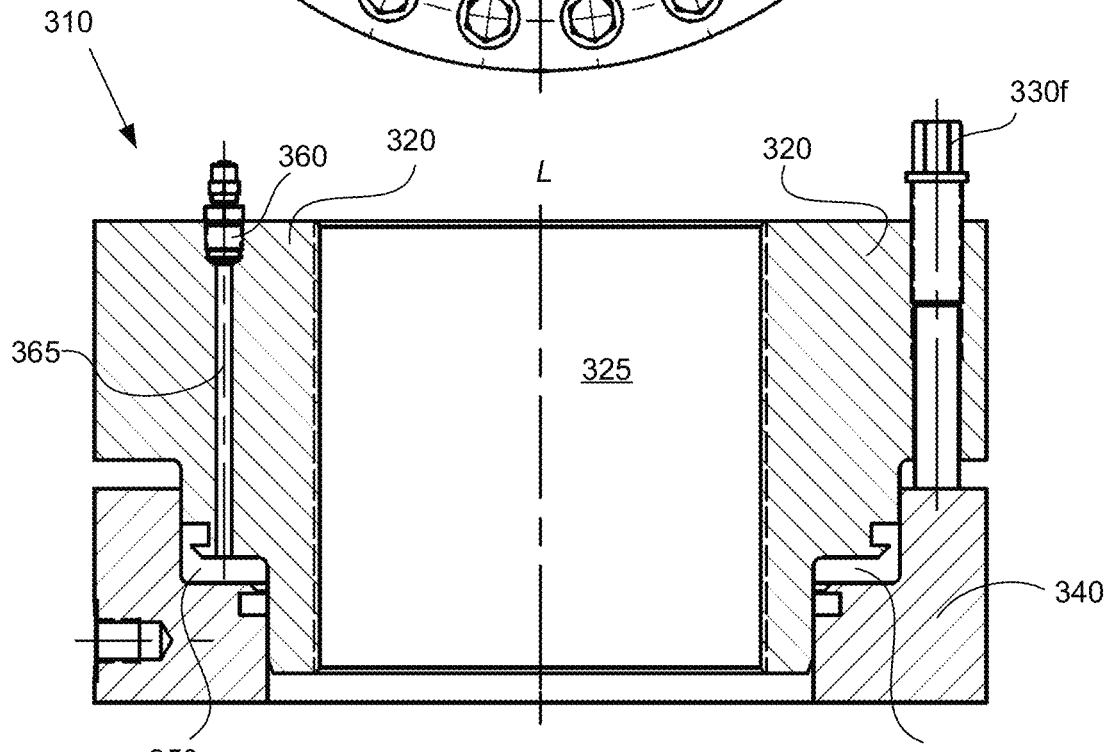
FIG. 9 is a sectional elevation view through line A-A indicated in FIG. 8 of the hydraulic MJT.
Figure 10:
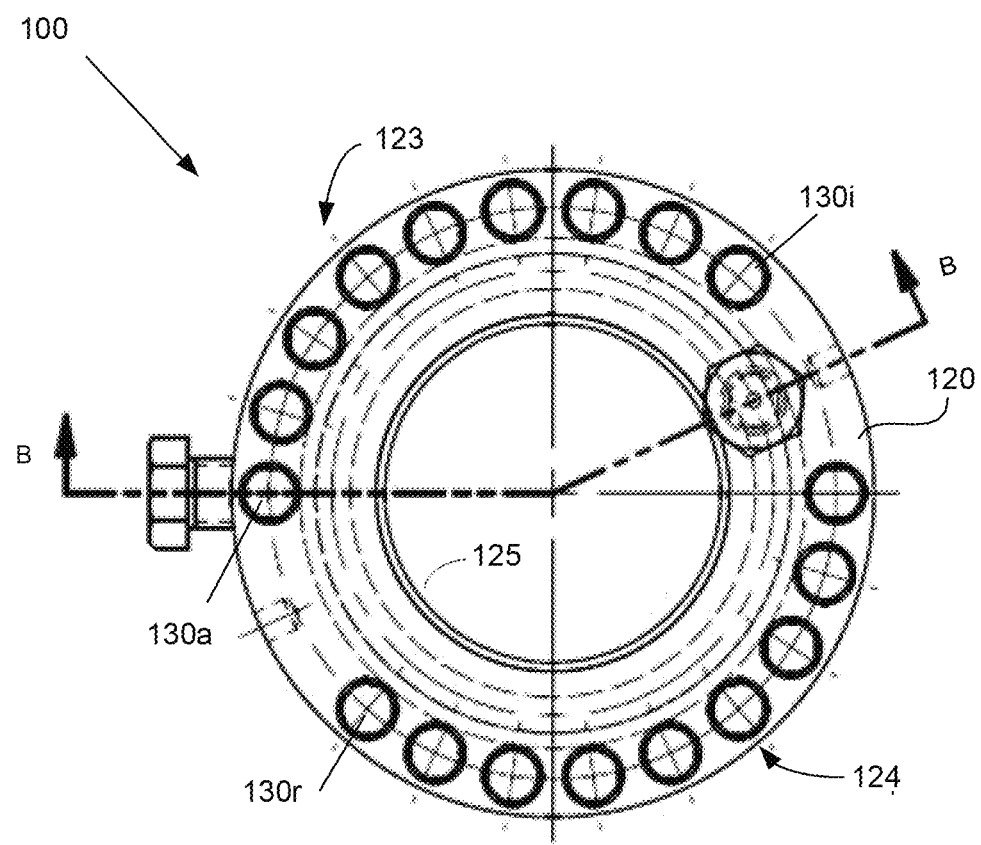
FIG. 10 is a top plan view of a preferred embodiment of a multiple chamber hydraulic MJT in accordance with an embodiment of the present invention.
Figure 11:
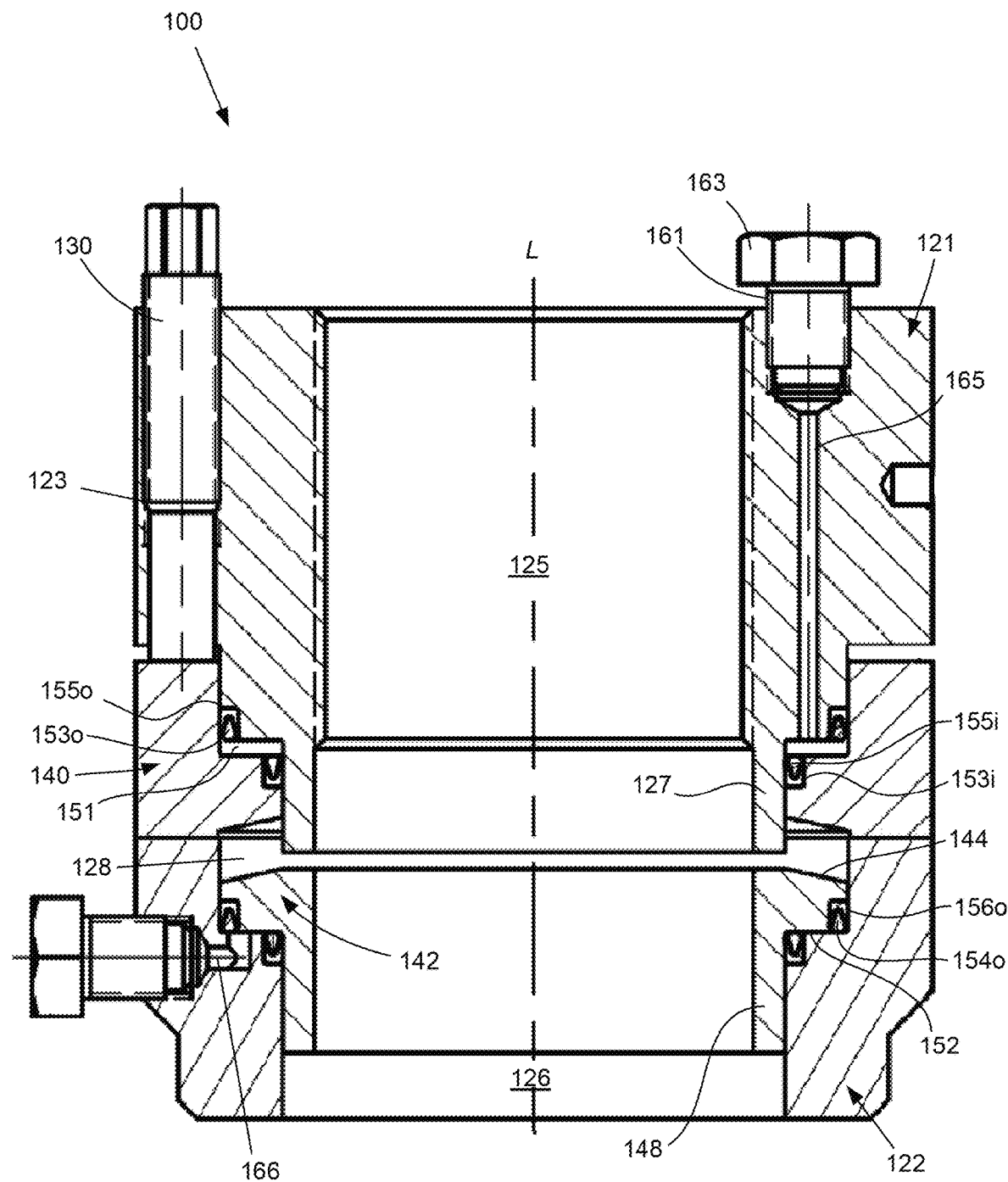
FIG. 11 is a sectional elevation view through line B-B of the multiple chamber hydraulic MJT of FIG. 10.
Figure 12:
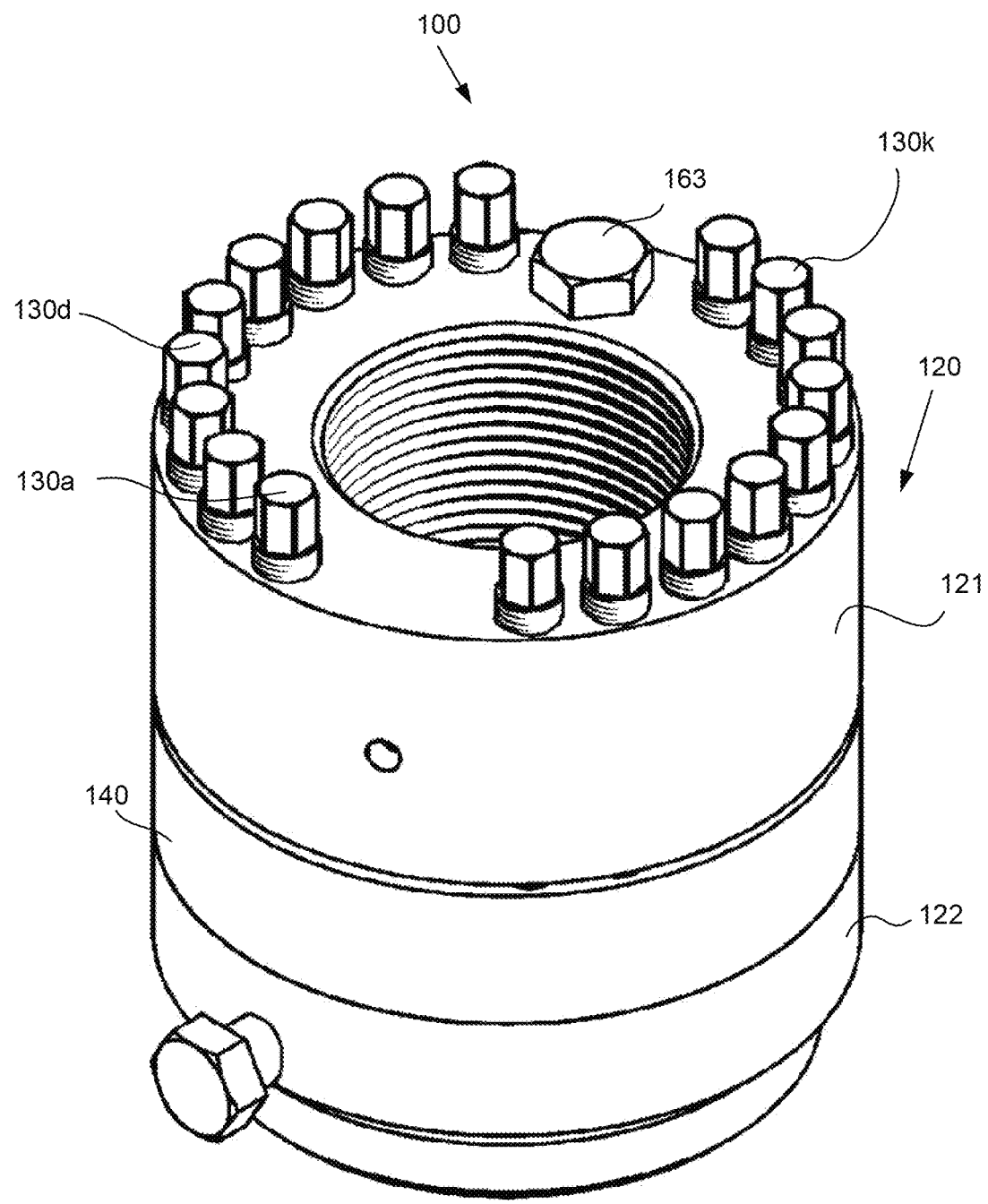
FIG. 12 is an isometric view of the multiple chamber hydraulic MJT of FIG. 10.
Figure 13:
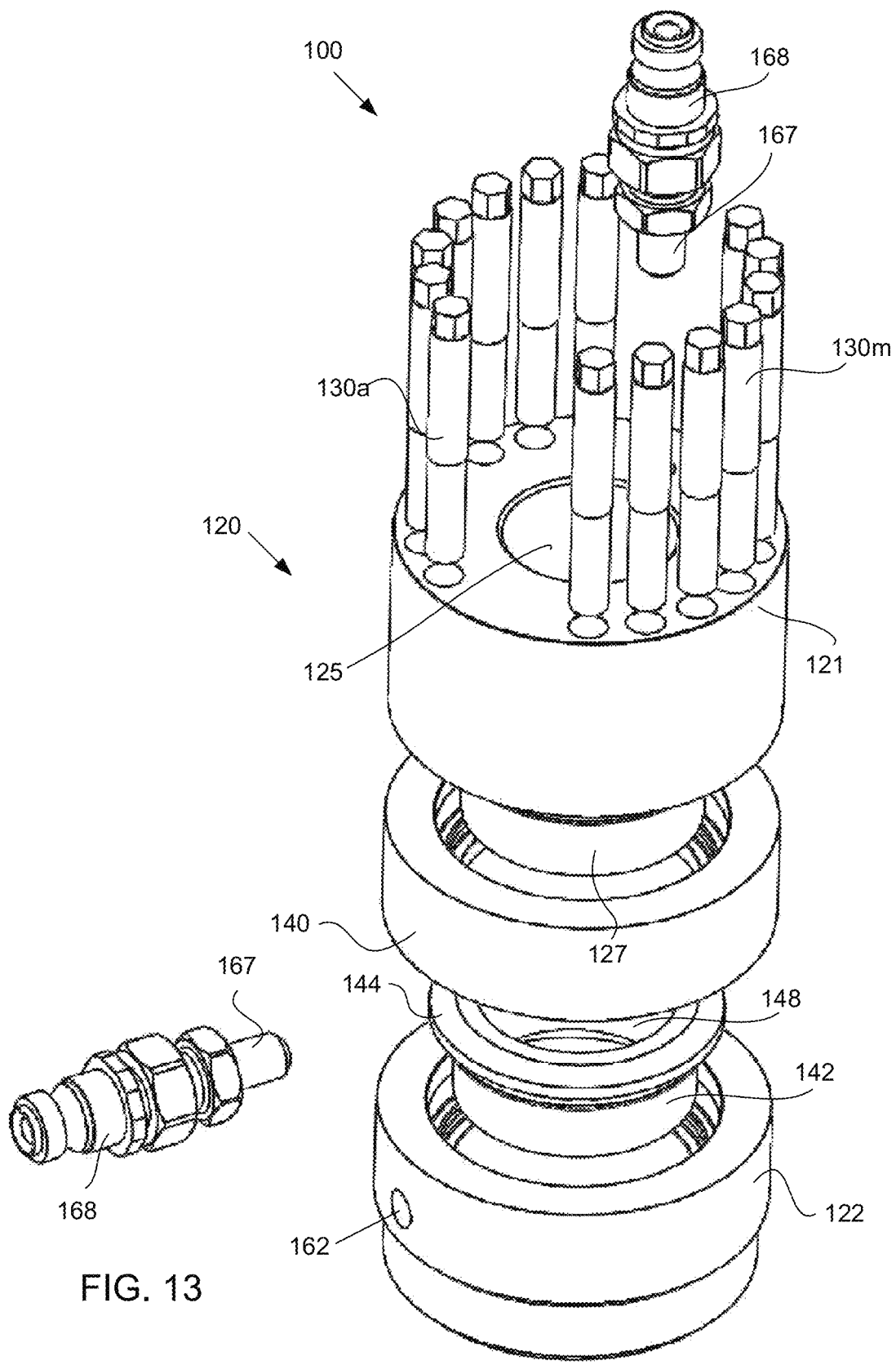
FIG. 13 is an exploded isometric schematic view of a multiple chamber hydraulic MJT of another embodiment of the multiple chamber hydraulic MJT of the invention.
Figure 14:
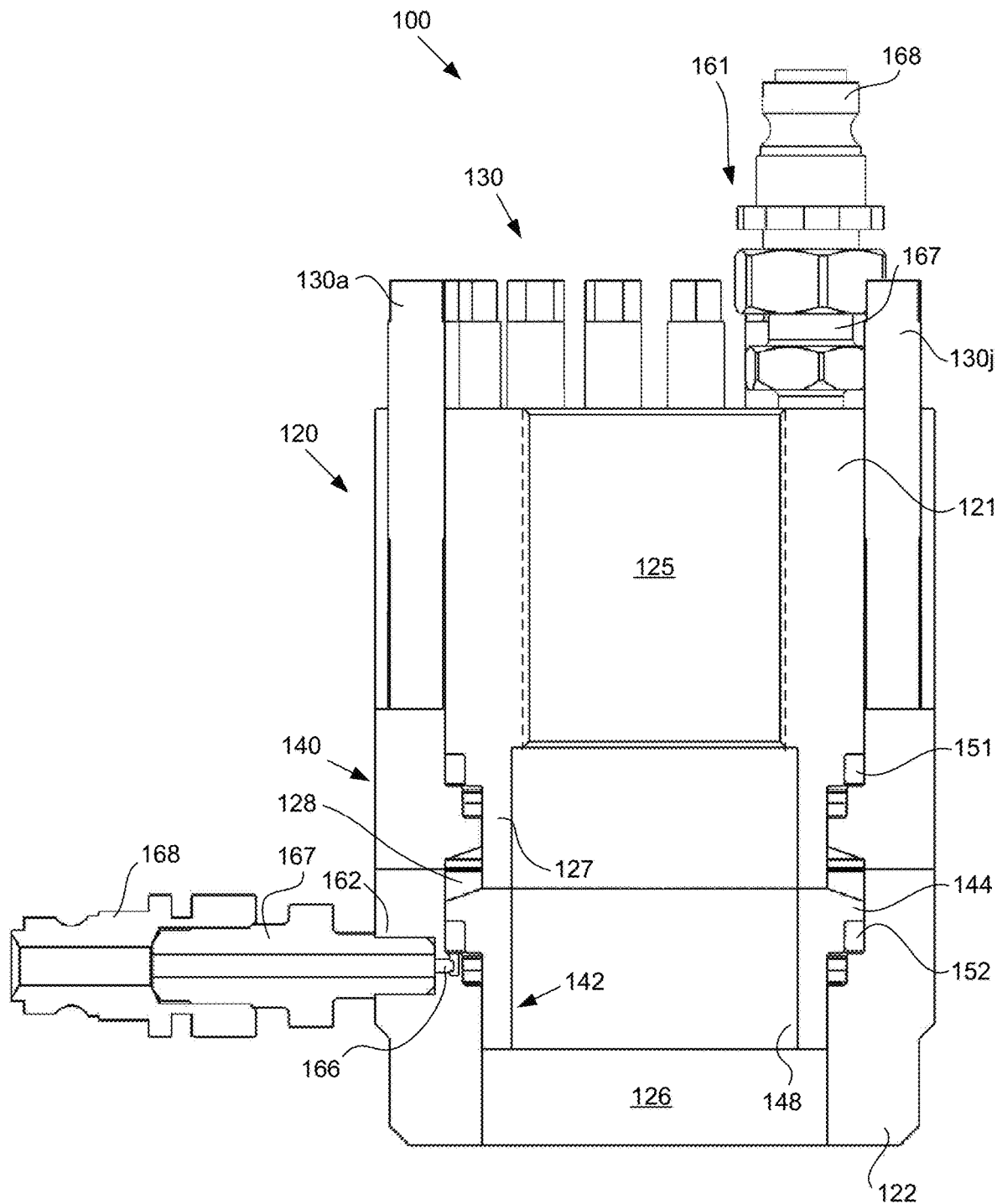
FIG. 14 is a sectional elevational view through line C-C of the multiple chamber hydraulic MJT of FIG. 13.
Figure 15:
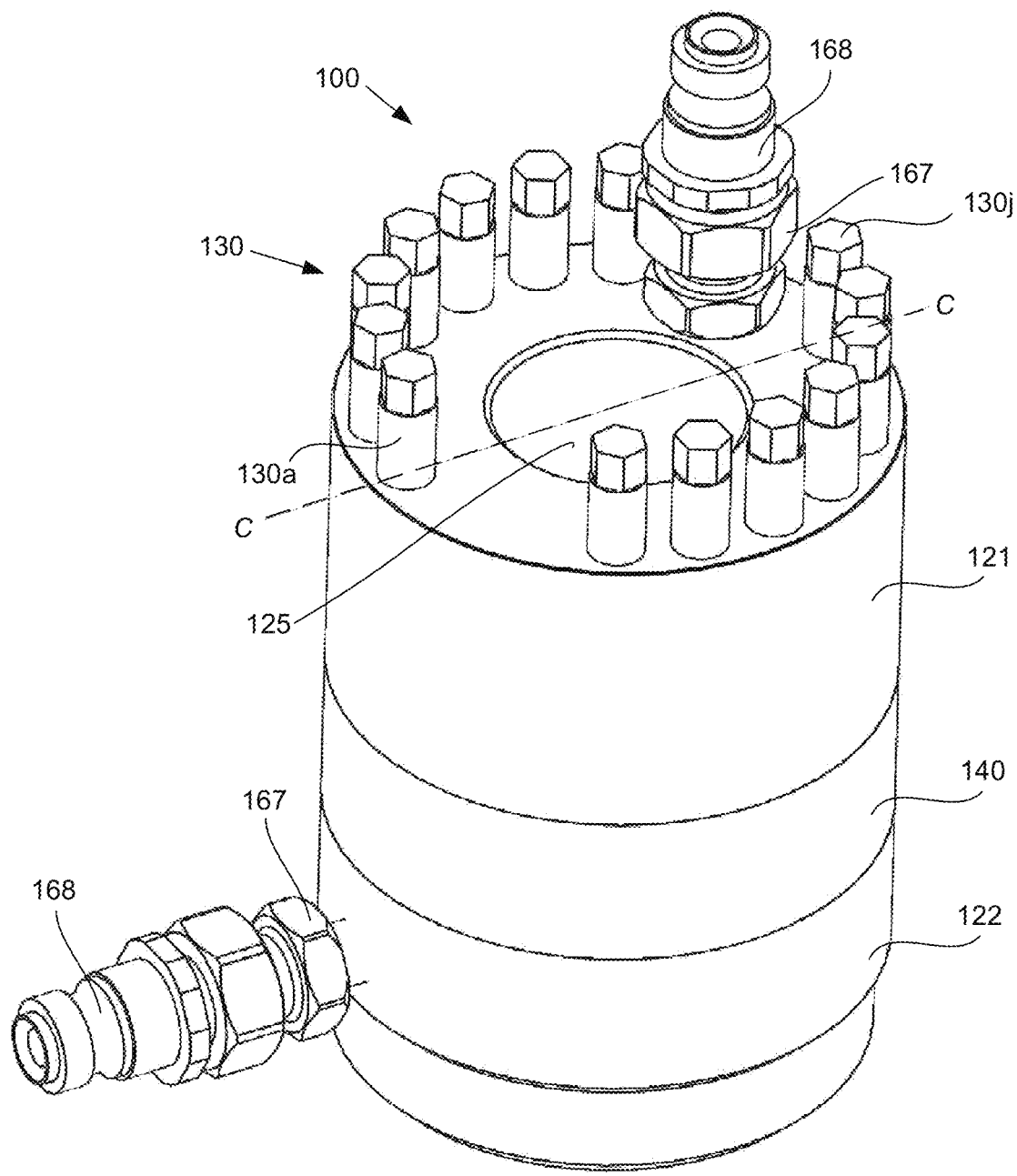
FIG. 15 is a top perspective view of the multiple chamber hydraulic MJT of FIG. 13.

Referring first to FIG. 10, there is illustrated in top plan view a hydraulic MJT 100 according to a first embodiment of the present invention. FIG. 11 is a sectional view of the hydraulic MJT 100 through the lines B-B as indicated in FIG. 10, whereas FIG. 12 is an isometric view of the exterior of the hydraulic MJT. FIGS. 13 to 15 comprise additional views of the hydraulic MJT 100 with hydraulic couplers installed for applying hydraulic pressure to pressure chambers of said MJT.

The hydraulic MJT 100 according to this embodiment of the invention is in the form of a nut style assembly and generally comprises an annular body 120 with central axis "L" which comprises a first, upper body section or "nut body" 121 having a central circular threaded hole 125 formed therethrough to receive a stud or bolt (e.g. bolt 400 of FIGS. 16 to 19), and a second lower body section 122 that is spaced from the first section and includes a co-axial bore 126. The annular body 120 is formed with a concentric polar array of threaded jack bolt holes therethrough, arranged in two arcuate sub-arrays 123, 124 as shown in FIG. 10. Through each of the threaded jack bolt holes there passes a corresponding one of a plurality of jack bolts 130a, . . . , 130r (which may be generally referred to herein as simply "130" for brevity).

The first, upper body section 121 rests upon a first piston 140 which in the present embodiment comprises a load bearing member that, in use, can apply force to a workpiece to be fastened, such as a pipe flange for example. The first piston 140 is arranged in the present embodiment to apply force to a workpiece (e.g. flange 404 of FIGS. 16 to 19) via the second body section 122 disposed below in the annular body 120. In some situations, the first piston 140 may apply the force to the workpiece via a further intermediate member such as a washer (e.g. washer 408a of FIGS. 16 to 19) or a yet further piston and/or body section. With reference to FIG. 11, the first body section 121 and the first piston 140 are shaped so that the first piston 140 slides about a lower wall 127 of the first body section and cooperates therewith to define a first circumferential pressure chamber 151 therebetween, suitably annular in shape. The first pressure chamber 151 is in fluid communication via a fluid passage 165 provided in the first body section 121 with an external hydraulic port 161, shown closed by a removable plug 163 in FIG. 11. The external port 161 may be positioned on the top outer periphery of the first body section 121 adjacent or proximate to at least one of the jack bolts 130. The first pressure chamber 151 is fluidically sealed by a hydraulic sealing arrangement, suitably including a combination of annular sealing ring 153 and retaining ring 155, provided at each of an inner location (denoted by suffix "i") and an outer location (denoted by suffix "o") between the first body section 121 first piston 140.

The second, lower, body section 122 is arranged in axial abutment with and below an annular end surface of the first piston 140 and includes, in addition to the axial bore 126 which cooperates with piston skirt 148, an internal recess 128 for receiving a radially outwardly extending flange portion 144 of a second piston 142. A second fluid chamber 152 is provided in the body 120 between the second piston 142 and the second body section 122, suitably between opposed annular surfaces of the flange 144 and the internal recess 128, respectively. A fluid sealing arrangement is provided between second piston and second body section 122. The sealing arrangement is similar to that provided for the first pressure chamber including, for example, an outer retaining ring 154o and an associated outer sealing ring 156o.

A consequence of the above configuration of dual chamber hydraulic MJT of the present embodiment is that first and second hydraulic circuits are arranged in parallel for separate operation via ports feeding respective hydraulic chambers 151, 152. Separate hydraulic circuits are desirable for providing for redundancy in some applications of the tensioner of the invention.

The operation of the hydraulic MJT 100 together with some further structural features will now be described with reference to FIGS. 16 to 19, which illustrate the pistons 140, 142 in different operational positions.

Figure 16:
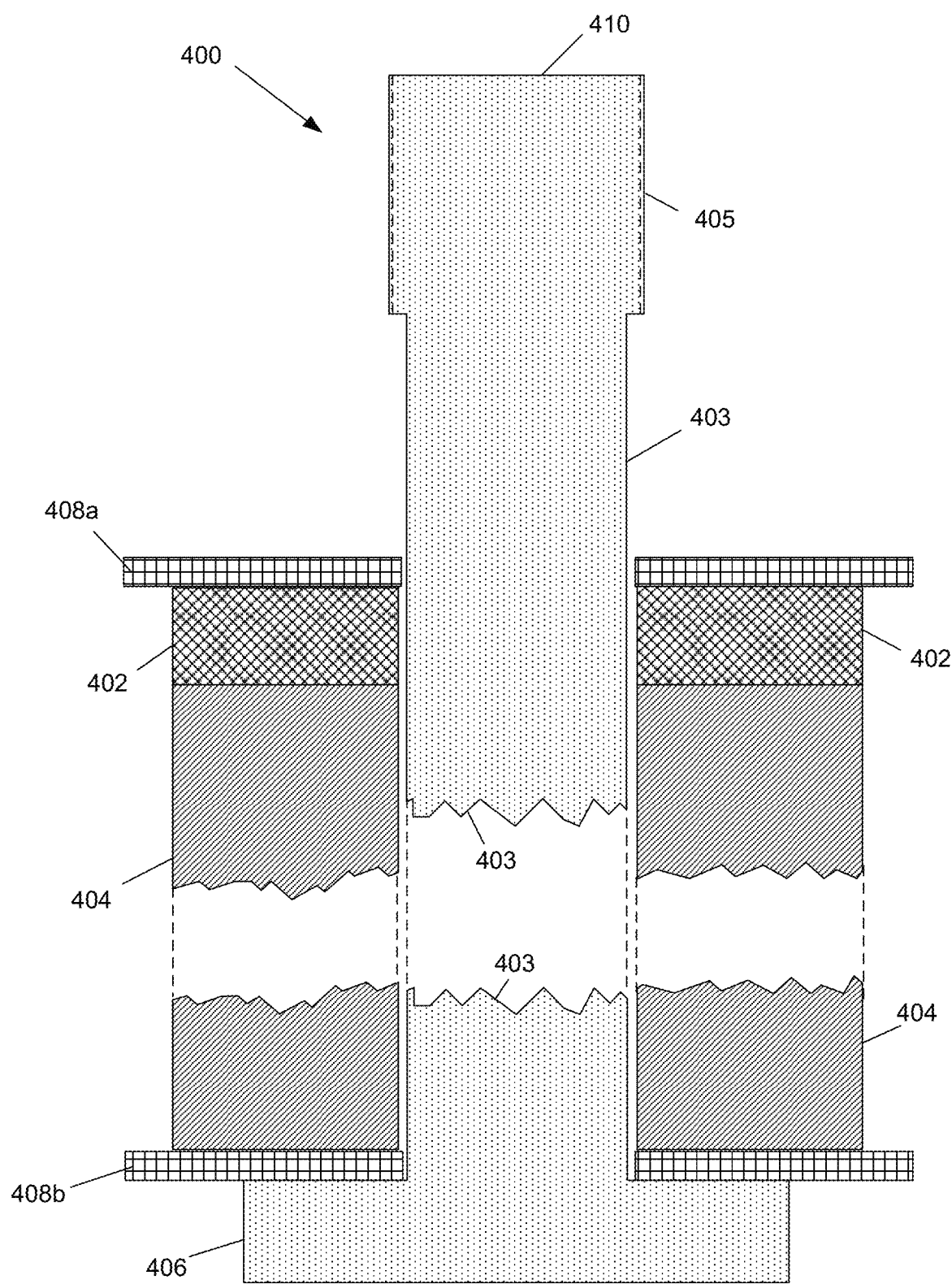
FIGS. 16-19 show the use of the hydraulic MJT to tension an elongate fastener in order to fasten two workpieces together in the form of opposed flanges.

FIG. 16 is a cross sectional side view of a bolt 400 with a shank 403 passing through first and second workpieces in the form of first and second flanges 402, 404 that are to be fastened together. A bearing surface of the head 406 of the bolt 400 abuts a washer 408b in this example. The washer 408b in turn abuts the outside of the second flange 404. The point 410 of the bolt 400 and the adjacent threaded length 405 of the shank 403 extends out through the second flange 402 for capture by the hydraulic MJT 100 as will be explained. In this example a second washer 408a surrounds the shank 403 and rests on the outer (i.e. upper as shown in FIG. 16) surface of the first flange 402.

Figure 17:
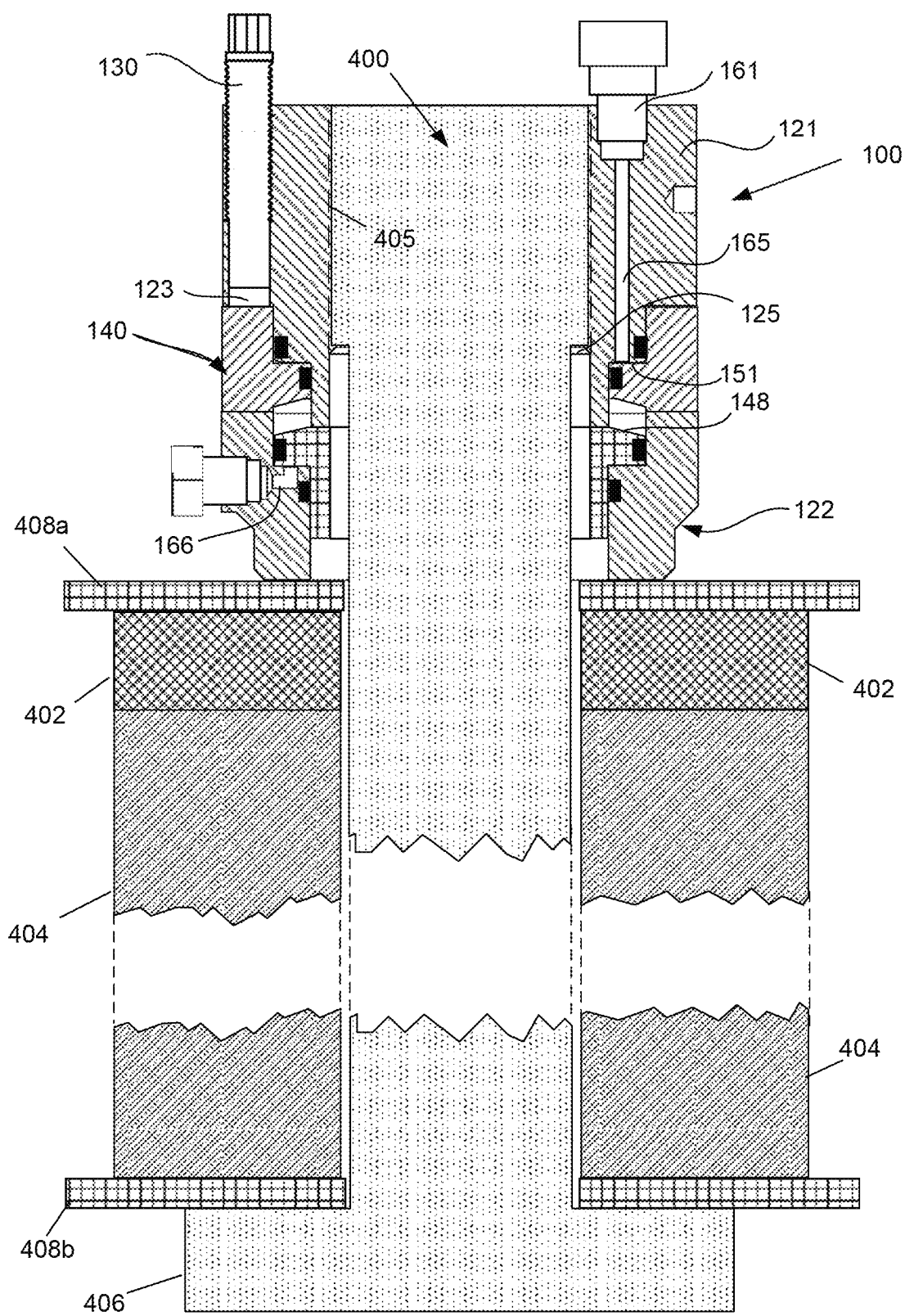

Referring now to FIG. 17, the hydraulic MJT 100, here in the form of a "nut", is installed onto bolt 400 engaging the threaded portion 405 of the bolt with the internally threaded central hole 125 of the first body section 121 until the load bearing member in the form of first piston 140 abuts the second body section 122 which in turn seats against the washer 408a which is located on the upper, outer, side of flange 402. The jack bolts 130 are sufficiently withdrawn in holes 123 of first body portion 121 so that the points of the jack bolts 130 do not abut the upper surface of the first piston 140 so as not to exert force against the first piston 140. In this initial position the first piston 140 and the first body section 121 are brought close together so that the volume of the first pressure chamber 151 is very small or zero.

Figure 18:
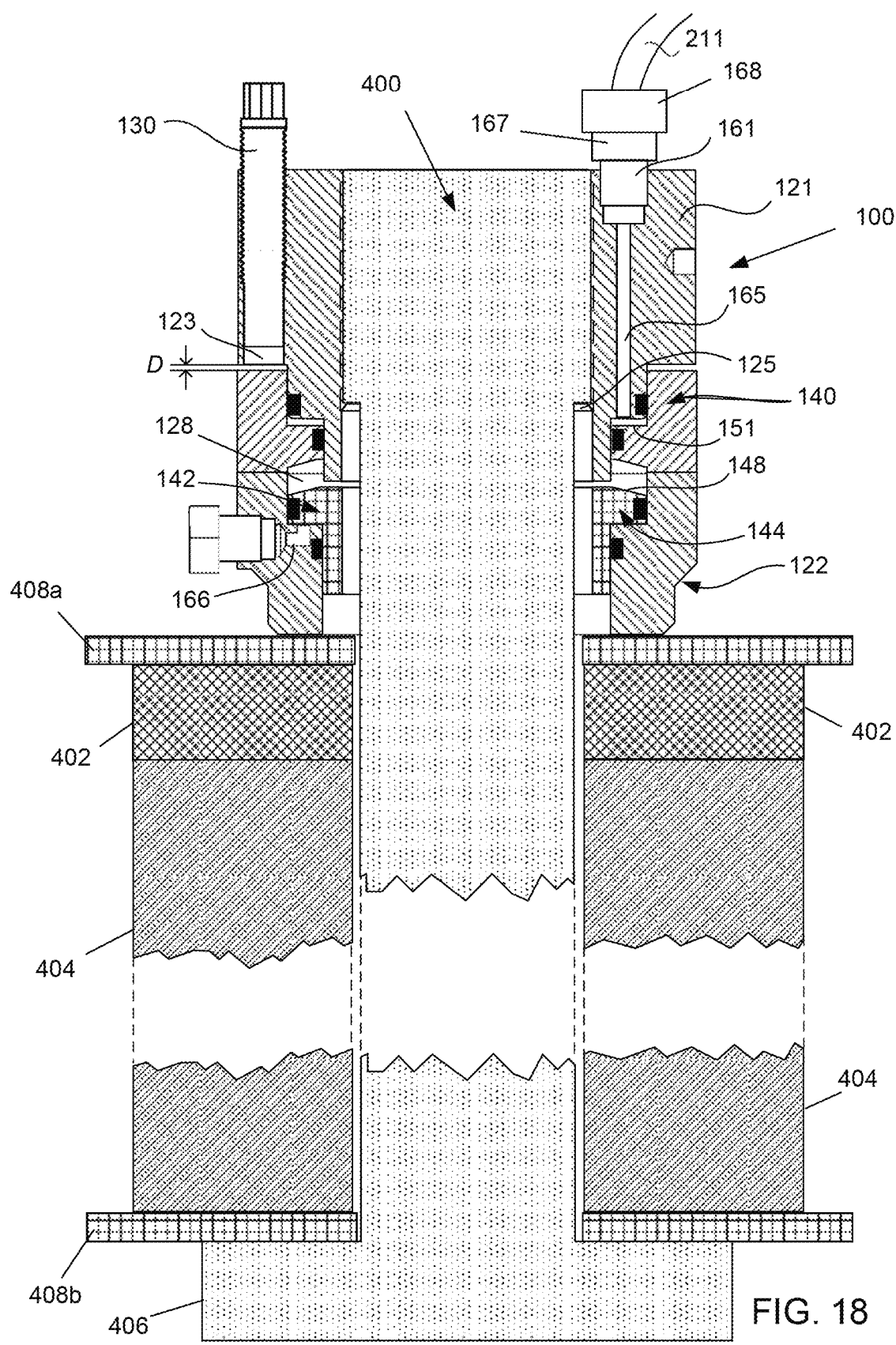

Subsequently, and as illustrated in FIG. 18, a suitable hydraulic line 211 is applied to the first hydraulic port 161 using a hydraulic nipple 167 and coupler 168. The hydraulic line 211 is coupled to a source of hydraulic power. Upon applying hydraulic pressure via the line 211 and coupler 168 via passage 165, the first hydraulic chamber 151 expands in response to the hydraulic fluid thereby forcing the piston 140 apart from the first body section 121 to a separation distance D and thereby tensioning the bolt 400. The underside of the load bearing member, which in the present example comprises second body section 122, bears down upon the outside, i.e. the topside as shown in FIG. 18, of the workpiece in the form of flange 402 via washer 408a (an any other intermediate members that may be needed for a particular fastening situation).

Figure 19:
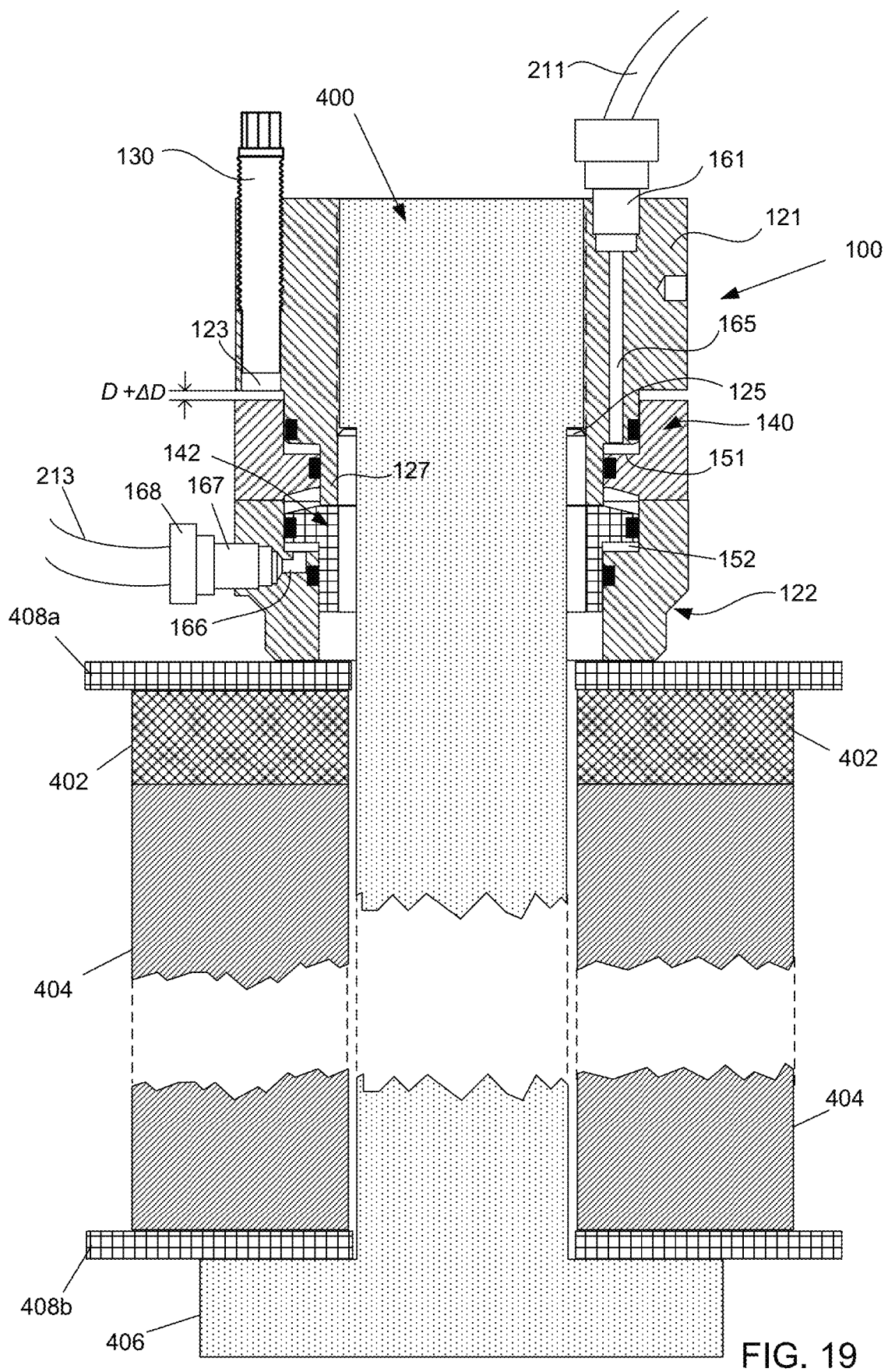

Turning to operation of the second piston 142, FIG. 18 depicts the second piston 142 in a neutral, unpressurized, position wherein the outwardly extending flange 144 rests upon an opposing annular surface of the recess 128. The annular surface has an opening in fluid communication with the second chamber 152 that is supplied with hydraulic pressure via passage 166 in use. As illustrated in FIG. 19 a further hydraulic line 213, suitably providing a separately controlled flow of hydraulic fluid, is applied to the second port 162 via a nipple 167 and coupler 168 for application of hydraulic pressure to second chamber 152 through passage 166. Here the fluid pressure in second chamber 152 forces the second piston 142 apart from the second body portion 122 until the piston abuts an external annular surface of the first body section 121, in the embodiment an upper surface of second piston 142 abuts a lower surface of the depending skirt portion 127 of the first body section 121. As further hydraulic pressure is applied via line 213 the second piston 142 displaces a little further through a distance $\Delta D$ as it forces first, upper, section 121 further upward and thus away from the first piston 140, which comprises the load bearing member, to a final distance, $D+\Delta D$ thereby further tensioning the bolt 400 that is engaged with the internal threaded surface of central hole 125 of upper section 121.

Figure 20:
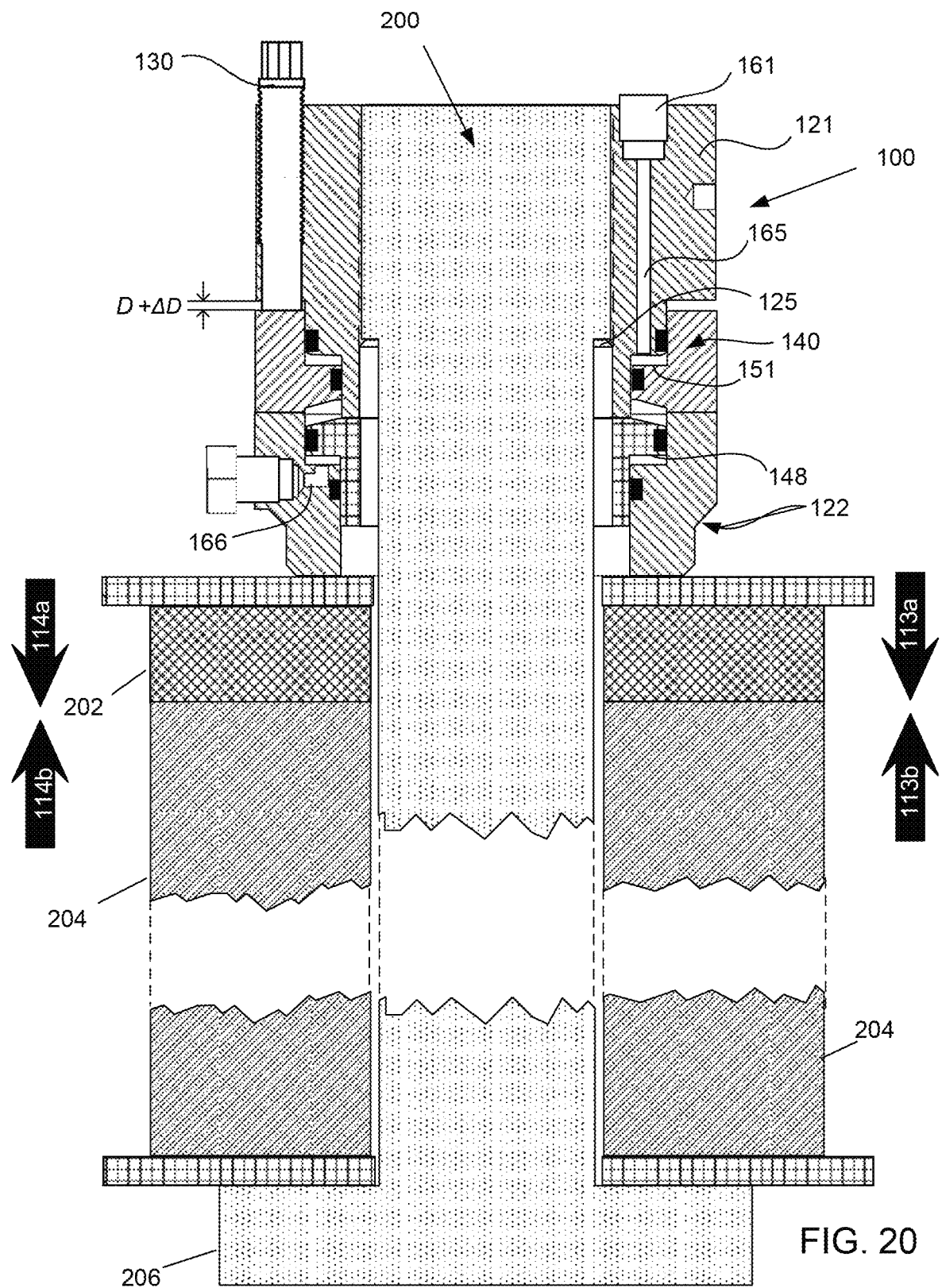
FIG. 20 is a schematic sectional elevational view of a further embodiment of the invention in the form of a "bolt style" multiple chamber MJT.

With reference to FIG. 20, whilst the first section 121 remains displaced through distance $D+\Delta D$ from the first piston 140, the jack bolts 130 are each rotated sufficiently to bring their points firmly against the load bearing member, which in the present embodiment comprises first piston 140. It is not essential to perform this step on the jack bolts 130 in any particular order because evenly distributed loading between the first body section 121 and the piston 140 has already been achieved by virtue of the application of the hydraulic pressure.

The separation of the first section 121 and the piston 140 results in the generation of an axial load when the hydraulic MJT 100 is mounted to the bolt 400 and the pressure chambers 151 and 152 receive hydraulic fluid. The tensioning of the bolt 400 results in compression and/or tightening of the work pieces, e.g. flanges 402 and 404 that are being joined. In the present example illustrated in FIG. 20, this means that the first and second flanges 402 and 404 are tightly compressed together as indicated by arrows 113a, 113b and 114a and 114b. This initial hydraulic pressurization step closes the joint between flanges 402 and 404 quickly. Multiple hydraulic MJTs like MJT 100 may be hydraulically operated simultaneously and from the same source of hydraulic power thereby ensuring uniform, simultaneous joint closure.

In a subsequent stage, after removal of the hydraulic pressure from both ports 161, 162, the jack bolts 130 may be further tightened to a desired torque setting (hereinafter "torqued"), for example with a torque wrench, thereby adjusting the distance between the first piston 140 and the body 121 to thereby apply a precise final preload to the bolt or stud.

Figure 21:
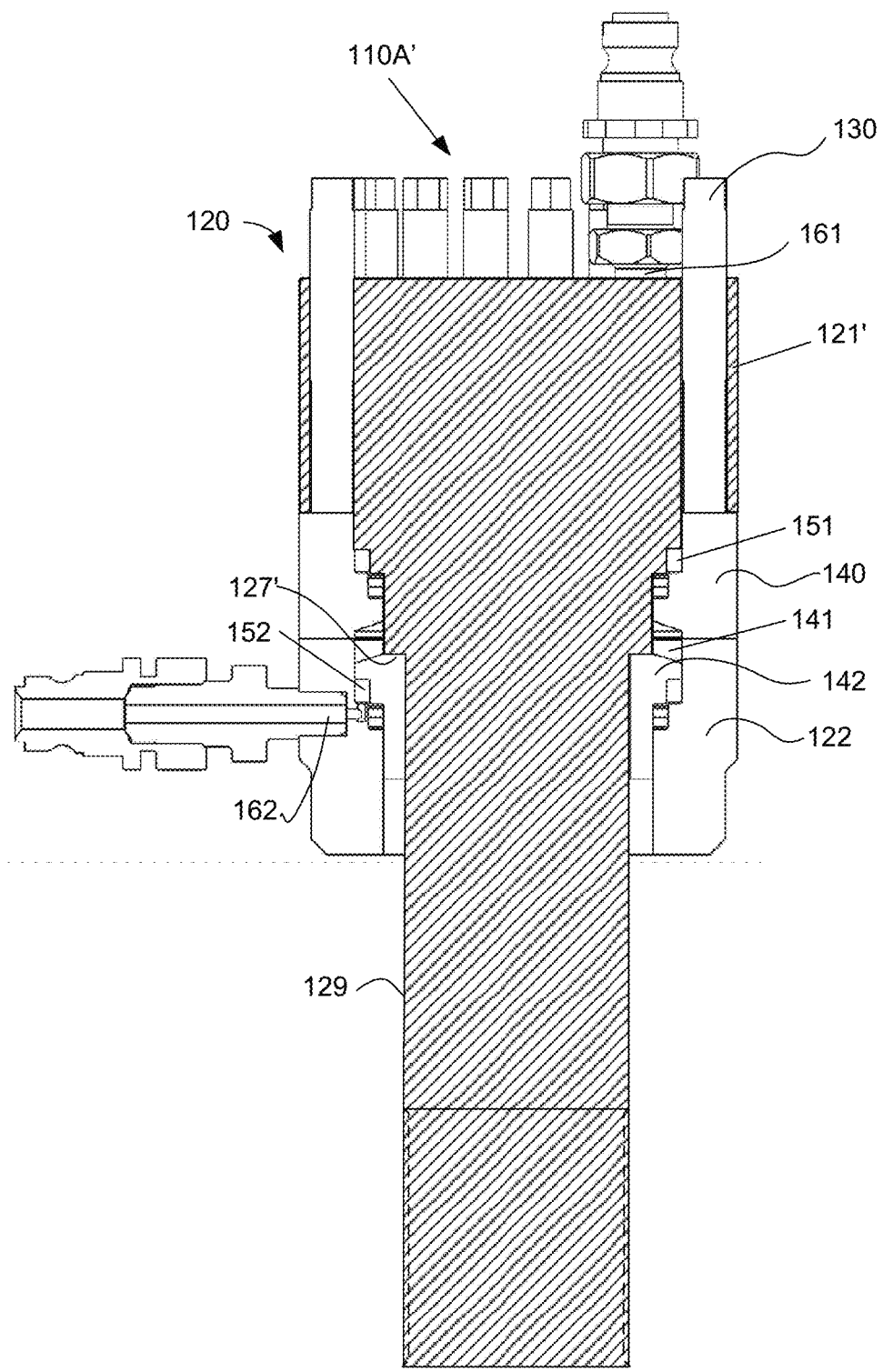
FIG. 21 is a schematic sectional elevational view of a further embodiment of the invention in the form of a "bolt-style" hydraulic MJT.

FIG. 21 illustrates a corresponding "bolt-style" embodiment of a hydraulic MJT fastener 110A' having a body 120, including a first body section 121' with an integral bolt shaft portion 129. A gap (not shown) may be created between the first body section 121' and first piston 140 when first pressure chamber 151 receives hydraulic fluid via first port 161 to generate the pre-load in the bolt form section 121'.

Upon application of hydraulic pressure to the first port the piston 140, which in this embodiment bears against a second body section 122 that comprises the load bearing member against a workpiece, and the first body section 121' move apart. Similarly, when fluid pressure is separately applied to second fluid chamber 152 via port 162, the second piston 142 moves away from the second body portion 122, and engages with an undersurface 127' of the first body section 121' which the piston 142 has moved toward, i.e. upwardly as depicted in FIG. 21. Note that clearance space 141 is provided between an upper fustoconical face of the second piston 142 and a lower frustoconical face of the first piston 140 in the present embodiment The array of jack bolts 130 is subsequently tightened and the hydraulic pressure may be released to transfer the pre-load to the locking collar 70. The jack bolts 130 can then be torqued to further tension the elongate fastener, e.g. bolt 121' having shaft portion 129. Accordingly, the hydraulic pressure may be removed as soon as the jack bolts 130 have been tightened and prior to further torqueing the jack bolts 130. In a variation of this embodiment the hydraulic MJTs 110A' may comprise an upper locking collar (not shown). The body 120 may suitably be provided with an outside thread to threadingly engage such a locking collar.

The Inventors have comprehended that by providing a hydraulic MJT which includes two (or more) hydraulic chambers, preferably axially displaced, in parallel, rather than a single chamber, embodiments of the present invention may have a smaller diameter and thus be more compact than hitherto known and thus able to be used where space is at a premium, whilst still being able to provide comparable tensioning forces and also allowing for some redundancy in tensioning the elongate fastening member.

As generally used herein, the articles "one", "a", "an", and "the" include "at least one" or "one or more" of what is claimed or described, unless indicated otherwise. For example, "a component" means one or more components, and thus, possibly, more than one component is contemplated and may be employed or used in an implementation of the described embodiments.

As generally used herein, the terms "include", "includes", and "including" are meant to be non-limiting.

As generally used herein, the terms "have", "has", and "having" are meant to be non-limiting.

As generally used herein, the term "stud" means tension elongated members, such as bolts, studs, and rods that may or may not comprise an integral head and/or threads. The integral head and/or threads may be configured to apply compression forces across a joint to produce a tension load in the stud. The threads may be configured for threaded connection with the hydraulic compression tool.

A person skilled in the art may appreciate that the hydraulic MJT tool and components thereof may be made from any appropriate material and may have any size required for a particular application using materials and stress calculations known in the art. The body may comprise metal, such as steel, the pressure chamber may comprise a polymer, and the washer may comprise brass or aluminum.

In one embodiment the body has a polar array of jack bolts spaced uniformly from a longitudinal central axis at spaced apart locations about an outer surface thereof. The body may comprise an annular recess for receiving a stud. The annular recess may comprise threads formed on its inside surface for threaded engagement with the stud. The annular recess may lack threads on its inside surface for engagement with the stud by compression fit. The body may comprise a threaded shaft to engage a hole, such as a threaded hole and a blind hole, in the work piece(s).

The body may comprise drilled and tapped holes to threadedly engage each jack bolt. The jack bolt may comprise a socket-head cap screw. A person having ordinary skill in the art may appreciate that the number of jack bolts may be selected according to the desired stress that is to be imposed on the shank portion of the fastener. The jack bolts may be arranged in only one annular array but two or more annular arrays may be used to accommodate the desired number of jack bolts. For example, the tool may comprise twenty-four jack bolts with twelve jack bolts spaced about each of the bolt centers in an alternating arrangement.

The jack bolt may extend through a tapped hole and project from the body into engagement with a support surface. An end face of the jack bolt may extend into compressive engagement with a support surface. The support surface may comprise the piston, a load cell, or a washer. For example, the support surface may comprise a flange portion of the piston. The washer may be constructed from material having a hardness predetermined according to the forces required to support the tool. The washer may be made from sufficiently hard material, such as metal or plastic, so that the washer may sustain the load imposed thereon by the jack bolt without yielding under the imposed load. The washer may be made from a sufficiently soft material so that the end face of the jack bolt is not upset under the applied load.

The jack bolts may be used to mechanically retain the axial load generated by the hydraulic pressure. The jack bolts may be torqued until the end surface firmly contacts the support surface. Each jack bolt may be rotated until the end face extends from the body to contact the support surface. The jack bolts may be torqued in a patterned sequence such as, for example, by torqueing jacks bolts at opposite sides of the body and then advancing to an adjacent jack bolt. A lubricant, such as graphite, may be applied to the threads of the jack bolt to facilitate torqueing thereof.

The hydraulic MJT may comprise a sealing device (not shown), such as a gasket, to substantially fluidly seal the pressure chamber so that hydraulic pressure may be generated. The sealing device may seal any gap between the body and piston. The pressure chamber may be defined by the body, the piston, fluid passage, and sealing device.

The tool may comprise one or more ports for each hydraulic circuit. The port/s may be located on a top surface of the body or piston, such as adjacent or proximate to at least one of the jack bolts, or on a side surface of the body section or piston. The port may comprise a standard threaded connection port to permit hydraulic fluid to be supplied to the pressure chamber at elevated pressure and vented therefrom. The port may comprise a one-way valve that threadedly engages the body and/or fluid passage. The one-way valve may prevent or reduce backflow when the pressure source is disconnected from the port.

The pressure source may comprise a high-pressure hand pump that is manually operated.

The body may comprise an opening configured to allow the insertion of a threading tool, such as a tommy bar (not shown), to assist the tensioning of the work piece(s). The opening may be positioned on the top and/or side outer periphery of the body.

A locking collar or shim may be used to mechanically retain the axial load generated by the hydraulic pressure. The locking collar may be torqued while under hydraulic pressure until a face of the locking collar firmly contacts an opposing face of the body and/or piston. The shim may be inserted in the gap between opposing faces of the body and piston that is generated by the hydraulic force. When the hydraulic pressure is released, the load is transferred onto the shims or locking collar to retain the load.

The locking collar may comprise one of a lower collar type and an upper collar type. The hydraulic MJT may comprise a lower locking collar including a piston having internal threads and external threads. The hydraulic MJT may comprise an upper locking collar including a piston having internal threads and external threads. The external threads of the piston may engage mating threads of the locking collar. A gap between the body and locking collar may be created when the pressure chamber receives hydraulic fluid to generate the pre-load. The width of the gap may generally relate to the compression of the joint, gasket, if fitted, and the elongation of the stud. The locking collar may be tightened and the pressure may be released to transfer the pre-load to the locking collar.

The hydraulic MJT may comprise an upper locking collar including a plain bore load cell and a collar nut. The collar nut may comprise internal threads and external threads. The external threads may engage mating threads of the locking collar. A gap between the body and locking collar may be created when the pressure chamber receives hydraulic fluid to generate the pre-load. The width of the gap may generally relate to the compression of the joint, gasket, if fitted, and the elongation of the stud. The locking collar may be tightened and the pressure may be released to transfer the pre-load to the locking collar. The port may be positioned on the side of the piston because the load cell has a plain bore.

The hydraulic MJT may comprise a shim, and the piston may comprise a flanged piston. A shim gap may be created when the pressure chamber receives hydraulic fluid to generate the pre-load. The width of the gap may generally relate to the compression of the joint, gasket, if fitted, and the elongation of the stud. The width of the shim gap may be measured and a shim having the desired width may be inserted into the shim gap. The shim may comprise one or more shims such that the shims completely fill the shim gap. Each shim may be configured to couple to at least a portion of the jack bolts.

A method of closing a vessel having a plurality of studs may generally comprise threading a hydraulic nut or hydraulic MJT onto at least one of the plurality of studs of the vessel, and injecting hydraulic fluid into at least one of the chambers of the hydraulic nut and/or hydraulic MJT to tension at least one stud. For example, the method may comprise threading a hydraulic MJT onto three bolts of the vessel that are spaced 120 degrees apart, and injecting hydraulic fluid into the chamber of each of the or hydraulic compression tools to tension each of the three bolts. MJTs may be positioned adjacent to each of the hydraulic compression tools and tightened to the desired preload. Then, the plurality of jack bolts on each of the hydraulic compression tools may be tightened to the desired preload, and the hydraulic pressure may be released. Alternatively, the hydraulic pressure may be released and the hydraulic compression tools may be replaced by MJTs that are then tightened to the desired preload. The method may also include applying hydraulic compression tools to all of the studs and linking them with hoses to perform a single pass hydraulic closure.

The method may comprise threading a hydraulic MJT onto each of the bolts of the vessel, wherein each of the hydraulic compression tools are in fluid communication with each other, and injecting hydraulic fluid into a chamber of each of the hydraulic compression tools to tension each of the bolts substantially simultaneously to the same preload. The load generated by the hydraulic compression tools may be evenly distributed around the joint such that a compression gasket may flow into any surface irregularities of the vessel to provide an improved seal relative to tightening the bolts individually. When the desired preload is achieved, the plurality of jack bolts on each of the hydraulic compression tools may be tightened to the desired preload, and the hydraulic pressure may be released.

The method may comprise torqueing the hydraulic MJT onto a bolt of the vessel relatively low torque level prior to introducing hydraulic fluid to the port. For example, the hydraulic MJT may be threaded onto the bolt until the hydraulic MJT contacts the surface of the vessel. Then a hydraulic pumping unit may deliver hydraulic fluid, such as high-pressure oil, into the pressure chamber of the hydraulic compression tool. As the hydraulic pressure increases, the resulting axial force elongates the bolt, and thereby may compress the joint. When the desired preload is achieved, the pressure supply may be stopped to release the hydraulic pressure.

The provision of multiple hydraulic chambers in the tool of the embodiment provides for redundancy in the sense that, should a hydraulic seal fail in one of the chambers, the tensioning process can still proceed using the remaining chamber/s albeit at reduced load capacity. The reduced capacity can be at least partially overcome by modifying the tightening regime utilizing the array of jack bolts. In the present embodiments, all jack bolts engage with the first piston. In a further embodiment, where there is sufficient available horizontal space, there may be provided a second polar array of jack bolts which transit the first piston, having distal ends which bear upon an outer (upper in the FIG. 10) face of an auxiliary load bearing member, for example the second body section 122. It will be appreciated that the second polar array may be provided in either an outer concentric arrangement, with enlarged diameter body sections, or around the body in alternating fashion with individual jack bolts of the first array in other applications.

Features, integers, characteristics, compounds, chemical moieties or groups described in conjunction with a particular aspect, embodiment or example of the invention are to be understood to be applicable to any other aspect, embodiment or example described herein unless incompatible therewith.

All documents cited herein are incorporated herein by reference, but only to the extent that the incorporated material does not conflict with existing definitions, statements, or other documents set forth herein. To the extent that any meaning or definition of a term in this document conflicts with any meaning or definition of the same term in a document incorporated by reference, the meaning or definition assigned to that term in this document shall govern. The citation of any document is not to be construed as an admission that it is prior art with respect to this application.

While particular embodiments have been illustrated and described, it would be apparent to those skilled in the art that various other changes and modifications can be made without departing from the spirit and scope of the invention. Those skilled in the art of the present invention will recognize, or be able to ascertain using no more than routine experimentation, numerous equivalents to the specific apparatuses and methods described herein, including alternatives, variants, additions, deletions, modifications and substitutions. This application including the appended claims is therefore intended to cover all such changes and modifications that are within the scope of this application.

What is claimed is:

1. A multi jack tensioner for applying tension to a fastener, the tensioner comprising: a body having at least one section, including a first body section and a second body section, wherein the first body section is formed to engage an elongate fastening member or integrally formed therewith; a load bearing member for applying force to a workpiece to be fastened and arranged for location about said fastening member adjacent the body, wherein the first body section engages the load bearing member; a first pressure chamber formed and defined by the load bearing member and the first body section arranged to displace the first body section axially relative to the load bearing member in response to hydraulic pressure; a second pressure chamber formed and defined by the second body section and a piston; and a plurality of jack bolts extending through the first body section and between the first body section and the load bearing member for further displacing the first body section from the load bearing member, wherein the plurality of jack bolts are adapted to abut the load bearing member; wherein application of hydraulic pressure to the first pressure chamber displaces the first body section from the load bearing member thereby tensioning said fastening member, wherein application of hydraulic pressure to the second pressure chamber displaces the first body section from the load bearing member to thereby tension said fastening member, and whereby subsequent tensioning of the fastening member is applied by operation of the jack bolts.

2. A multi jack tensioner according to claim 1, wherein the first pressure chamber is defined by a surface of the first body section and a surface of the load bearing member whereby introduction of hydraulic pressure into the first pressure chamber displaces the first body section from the load bearing member.

3. A multi jack tensioner according to claim 2, wherein the load bearing member is formed as a piston arranged to cooperate with the body.

4. A multi jack tensioner according to claim 2, wherein the body is formed with an axially extending central hole, wherein the first section thereof is arranged to threadedly engage the elongate fastening member where the elongate fastening member comprises a bolt or stud.

5. A multi jack tensioner according to claim 2, wherein the body is integrally formed with the elongate fastening member.

6. A multi jack tensioner according to claim 2, wherein the piston is adapted to abut the first body section.

7. A multi jack tension according to claim 2, wherein the second body portion adapted to abut the loading bearing member.

8. A multi jack tensioner according to claim 1, wherein the second pressure chamber is defined between a surface of the second section and a surface of the piston that slides in an opening of the second body section whereby introduction of hydraulic pressure into the second pressure chamber displaces the piston relative to the second section of the body.

9. A multi jack tensioner according to claim 8, wherein the first body section includes a portion that extends into the opening of the second body section which is forced away from the second body section by the piston upon the introduction of the hydraulic pressure into the second pressure chamber to thereby displace the first body section from the load bearing member.

10. A multi jack tensioner according to claim 9, wherein the load bearing member is axially disposed between the first body section and the second body section.

11. A multi jack tensioner according to claim 9, wherein the portion that extends into the opening of the second body section comprises a lower skirt that wherein the first pressure chamber is defined between the load bearing member and the first body section adjacent the lower skirt.

12. A multi jack tensioner according to claim 8, including first and second hydraulic fluid ports in fluid communication with the first and second pressure chambers.

13. A multi jack tensioner according to claim 12, wherein the first and second hydraulic fluid ports extend from the body at right angles to each other.

14. A multi jack tensioner according to claim 13, wherein the first hydraulic fluid port is located on an end of the first section adjacent heads of the jack bolts and wherein a fluid passage extends from said first port through the first section to the first pressure chamber.

15. A multi jack tensioner according to claim 14, wherein the second hydraulic fluid portion is located on a side of the second section and wherein a fluid passage extends radially from said second port through the second section to the second pressure chamber.

16. A multi jack tensioner comprising: a body having a first body section formed to engage an elongate fastening member or integrally formed therewith; a first piston received by the first body section for applying force to a workpiece to be fastened; a first pressure chamber formed and defined by the first piston and the first body section and the first piston arranged to displace the first body section from the first piston in response to hydraulic pressure; the body further including a second body section abutting the first piston and including a co-axial bore for receiving a second piston arranged to selectively abut the first body section; a second pressure chamber formed and defined by the second body section and the second piston arranged to displace the second piston from the second body section; and a plurality of jack bolts extending through the first body section and between the first body section and the first piston for further displacing the first body section from the first piston; wherein application of hydraulic pressure to either the first or second hydraulic chamber displaces the first body section relative to the second body section for tensioning said fastening member and whereby subsequent tensioning of the fastening member is applied by operation of the jack bolts.

17. A multi jack tensioner according to claim 16, wherein the first body section is formed with an axial recess to threadedly engage the elongate fastening member wherein the elongate fastening member comprises a bolt or stud.

18. A multi jack tensioner according to claim 16, wherein the first body section is integrally formed with the elongate fastening member.

19. A multi jack tensioner according to claim 16, wherein the plurality of jack bolts comprises a polar array of jack bolts threadedly received through holes formed through the first body section and spaced uniformly from a longitudinal central axis of the body at spaced apart locations about an outer surface thereof.

20. A method for compressing first and second workpieces together comprising the steps of: locating an elongate fastening member across the first and second workpieces wherein a first end of the elongate fastening member is fast with the first workpiece, wherein the second end of the elongate fastening member is captured by a first body section and a load bearing member, wherein a body comprises the first body section and a second body section, wherein a first pressure chamber is formed and defined by the first body section and the load bearing member, and wherein a second pressure chamber is formed and defined by the second body section and a piston; tensioning the elongate fastening member by applying hydraulic pressure to the first pressure chamber and the second pressure chamber that axially spaced along the elongate fastening member and disposed between said second end of said fastening member and an outer side of the second workpiece; and further tensioning the elongate member with a plurality of jack bolts extending through the first body section and between the first body section and the load bearing member for further displacing the first body section from the load bearing member; whereby the tensioning of the elongate fastening member results in compressing the first and second workpieces towards each other.

\* \* \* \* \*